US012798561B2

(12) United States Patent
Larsson et al.

(10) Patent No.: US 12,798,561 B2
(45) Date of Patent: Nov. 17, 2026

(54) SELECTIVELY VISUALIZING SAFETY MARGINS

(71) Applicant: QUALCOMM Incorporated, San Diego, CA (US)

(72) Inventors: Annika Larsson, Gothenburg (SE); Rachel Gray Alexander, Chicago, IL (US); Shabin Mahadevan, Lake Orion, MI (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 18/451,749

(22) Filed: Aug. 17, 2023

(65) Prior Publication Data

US 2025/0058770 A1 Feb. 20, 2025

(51) Int. Cl.

| | |
|---|---|
| ***B60W 30/09*** | (2012.01) |
| ***B60W 40/09*** | (2012.01) |
| ***B60W 50/14*** | (2020.01) |
| ***G06T 19/00*** | (2011.01) |
| ***G08G 1/16*** | (2006.01) |

(52) U.S. Cl.

CPC ............ *B60W 30/09* (2013.01); *B60W 40/09* (2013.01); *B60W 50/14* (2013.01); *G06T 19/006* (2013.01); *G08G 1/166* (2013.01)

(58) Field of Classification Search

CPC ...... B60W 30/09; B60W 40/09; B60W 50/14; G06T 19/006; B60K 2360/177

See application file for complete search history.

(56) References Cited

U.S. PATENT DOCUMENTS

| | | | | |
|---|---|---|---|---|
| 9,581,457 B1 * | 2/2017 | Meredith ........... | G01C 21/3679 |
| 2005/0259033 A1 * | 11/2005 | Levine .................. | G08G 1/165 345/7 |
| 2010/0253493 A1 * | 10/2010 | Szczerba ................ | G02B 27/01 345/593 |
| 2013/0187771 A1 * | 7/2013 | Rothschild ......... | G08G 1/09675 340/435 |
| 2015/0314783 A1 | 11/2015 | Nespolo et al. | |
| 2018/0147988 A1 * | 5/2018 | Lee ....................... | B60W 50/14 |
| 2018/0157036 A1 * | 6/2018 | Choi .................. | G02B 27/0101 |

(Continued)

FOREIGN PATENT DOCUMENTS

DE 102020200762 A1 7/2021

OTHER PUBLICATIONS

International Search Report and Written Opinion—PCT/US2024/035657—ISA/EPO—Oct. 14, 2024—16 pages.

*Primary Examiner* — Kito R Robinson
(74) *Attorney, Agent, or Firm* — Thien T. Nguyen

(57) ABSTRACT

Aspects presented herein may enable a UE (e.g., a vehicle, an autonomous vehicle, an on-board unit (OBU) of a vehicle, an advanced driver assistance systems (ADAS) of a vehicle) to calculate and output safety margins for objects around the UE or a vehicle. In one aspect, a UE receives or transmits a request to provide safety margin visualization assistance. The UE obtains, in response to the request, an indication of a safety margin associated with an object based on a distance between the UE and the object and at least one of: a size of the object, a speed of the object, a location of the object, a type of the object, a direction of the object, or a movement pattern of the object. The UE outputs the safety margin associated with the object.

21 Claims, 16 Drawing Sheets

(56) References Cited

U.S. PATENT DOCUMENTS

| | | | | |
|---|---|---|---|---|
| 2021/0287529 | A1* | 9/2021 | Beauchamp | G08G 1/161 |
| 2023/0138112 | A1* | 5/2023 | Gross | G05D 1/0038 701/24 |

* cited by examiner

1100B

1100A

1200

SELECTIVELY VISUALIZING SAFETY MARGINS

TECHNICAL FIELD

The present disclosure relates generally to communication systems, and more particularly, to image processing involving visualizing safety margins.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives or transmits a request to provide safety margin visualization assistance. The apparatus obtains, in response to the request, an indication of a safety margin associated with an object based on a distance between a user equipment (UE) and the object and at least one of: a size of the object, a speed of the object, a location of the object, a type of the object, a direction of the object, or a movement pattern of the object. The apparatus outputs the safety margin associated with the object.

In an aspect of the disclosure, a method, a computer-readable medium, and an apparatus are provided. The apparatus receives, from a UE, a request to provide safety margin visualization assistance. The apparatus configures, in response to the request, a safety margin associated with an object based on a distance between the UE and the object and at least one of: a size of the object, a speed of the object, a location of the object, a type of the object, a direction of the object, or a movement pattern of the object. The apparatus transmits, to the UE, an indication of the safety margin associated with the object.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
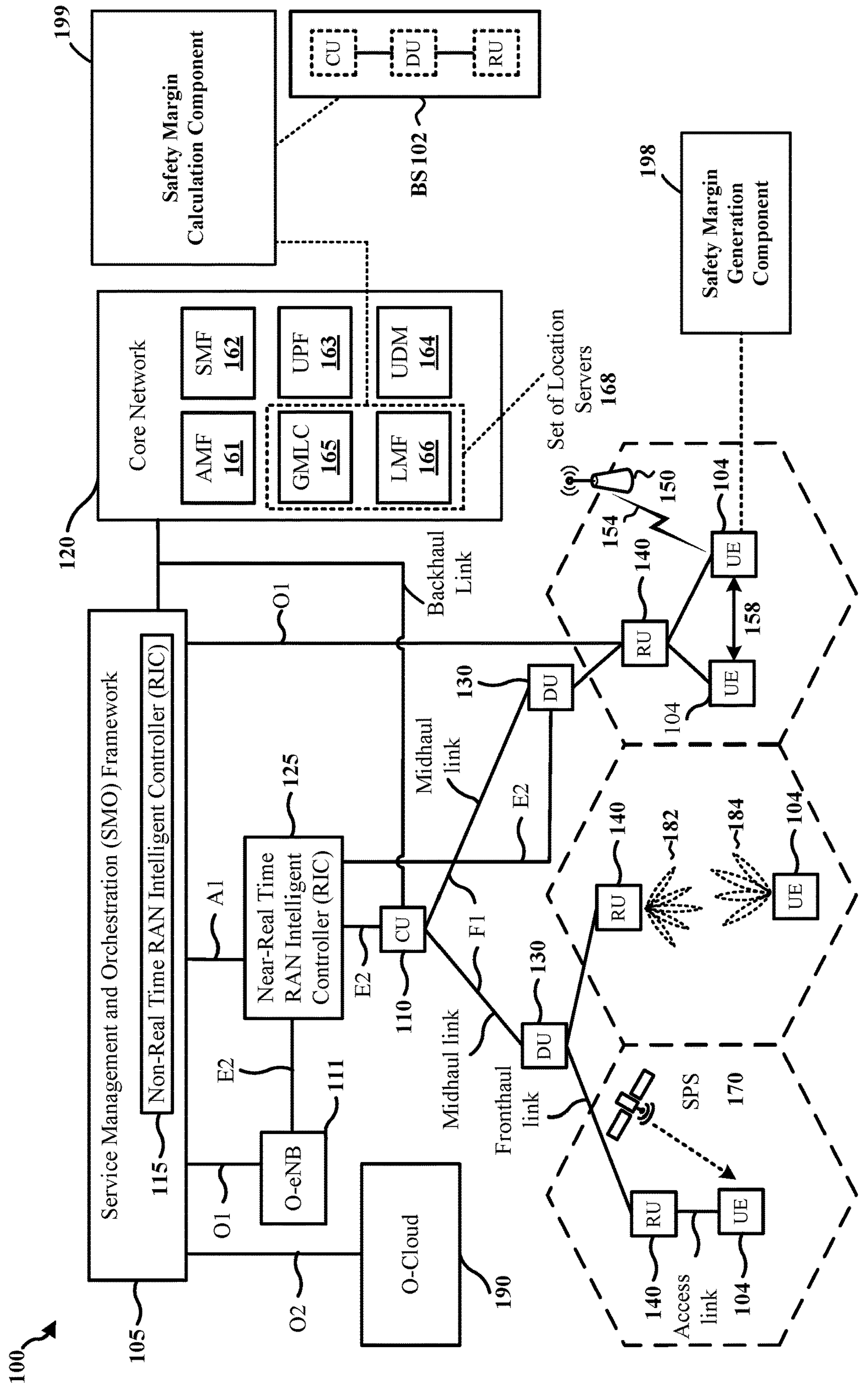
FIG. 1 is a diagram illustrating an example of a wireless communications system and an access network.

Aspects presented herein may improve the road safety by enabling drivers to visualize safety margins for objects around the drivers. Aspects presented herein may also enable drivers to know the distances and safety margins between their vehicles and other objects, thereby enabling the drivers to learn the safety distances around their vehicles. In one aspect of the present disclosure, as visualizations on head-down displays (e.g., vehicle backup camera system) have been beneficial to indicate system logic and affect driving behaviors of drivers, visualization modules such as an augmented reality (AR) display or an extended reality (XR) display may be used to enable drivers to visualize safety margins for objects around their vehicles ahead of time (e.g., via the windshield of the vehicle), thereby enabling improved road safety learning and/or driver coaching for the drivers.

Aspects presented herein are directed to techniques for AR display of safety margins to assist drivers with visualizing safety margins with respect to other vehicles/objects/obstacles that may pose some safety issues with respect to the ego vehicle (e.g., encroaching of the path of the ego vehicle). Aspects presented herein may be integrated with an advanced driver assistance systems (ADAS) system. Aspects presented herein may include the following aspects: Calculate probabilities of collision trajectory based on various sources of information including travel paths, objects and obstacles, high-definition (HD) map, vehicle-to-everything (V2X) data, etc. Calculate dynamic safety margins based on the calculated probabilities and safety margin data for object type/size. AR display showing safety margin with respect to various objects/obstacles that potentially cause safety issues with respect to the ego vehicle's travel path. Other sources of information can also be utilized to customize/optimize the proposed solution. These additional sources of information may include environment conditions, drive's attentiveness level (obtained using driver monitoring system (DMS)), and/or ego vehicle driver model (e.g., driving profile).

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140. Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a safety margin generation component 198 that may be configured to receive or transmit a request to provide safety margin visualization assistance; obtain, in response to the request, an indication of a safety margin associated with an object based on a distance between the UE and the object and at least one of: a size of the object, a speed of the object, a location of the object, a type of the object, a direction of the object, or a movement pattern of the object; and output the safety margin associated with the object. In certain aspects, the base station 102 or the one or more location servers 168 may have a safety margin calculation component 199 that may be configured to receive, from a UE, a request to provide safety margin visualization assistance; configure, in response to the request, a safety margin associated with an object based on a distance between the UE and the object and at least one of: a size of the object, a speed of the object, a location of the object, a type of the object, a direction of the object, or a movement pattern of the object; and transmit, to the UE, an indication of the safety margin associated with the object.

Figures 2A, 2B, 2C, 2D:
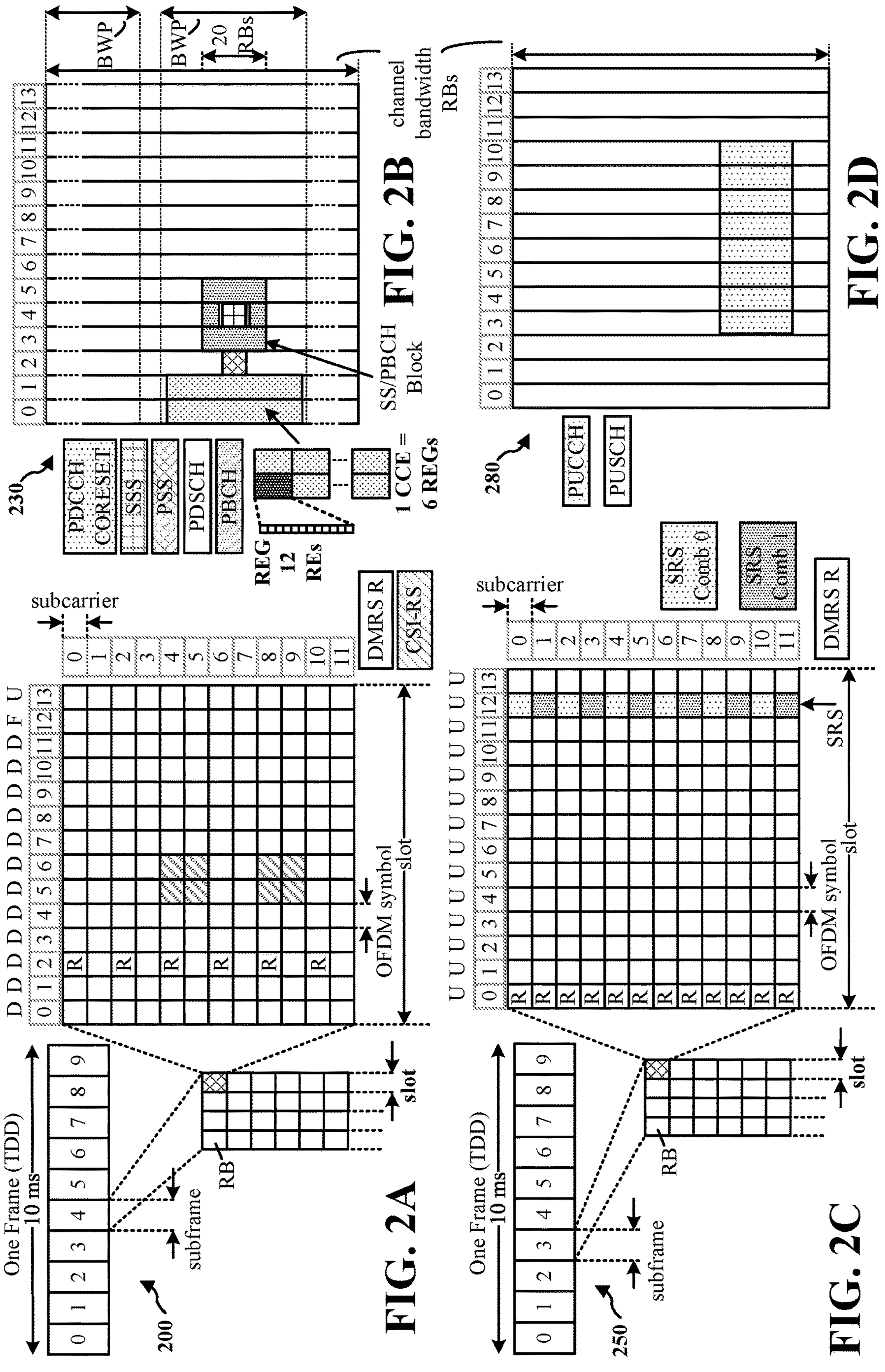
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
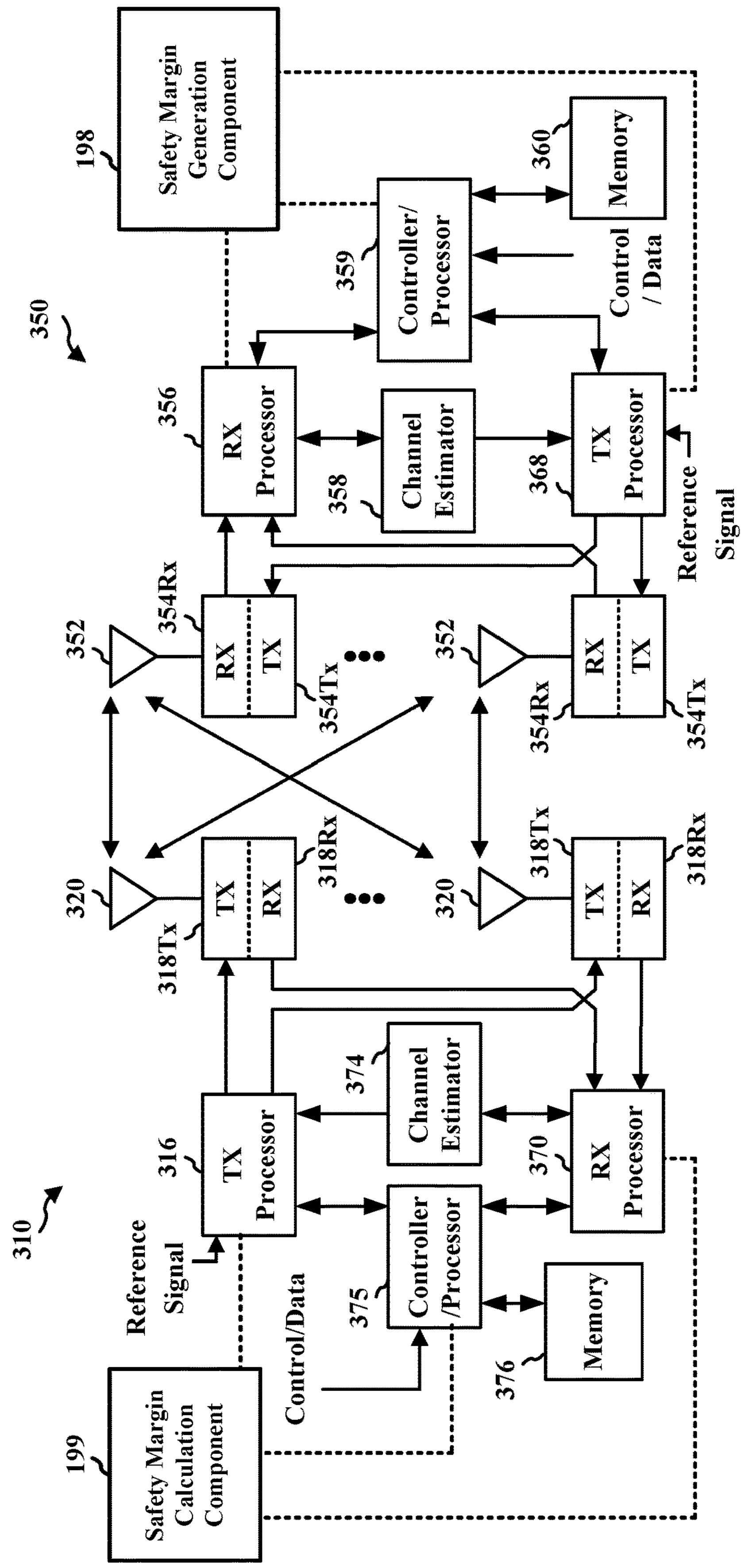
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the safety margin generation component 198 of FIG. 1.

At least one of the TX processor 316, the RX processor 370, and the controller/processor 375 may be configured to perform aspects in connection with the safety margin calculation component 199 of FIG. 1.

Figure 4:
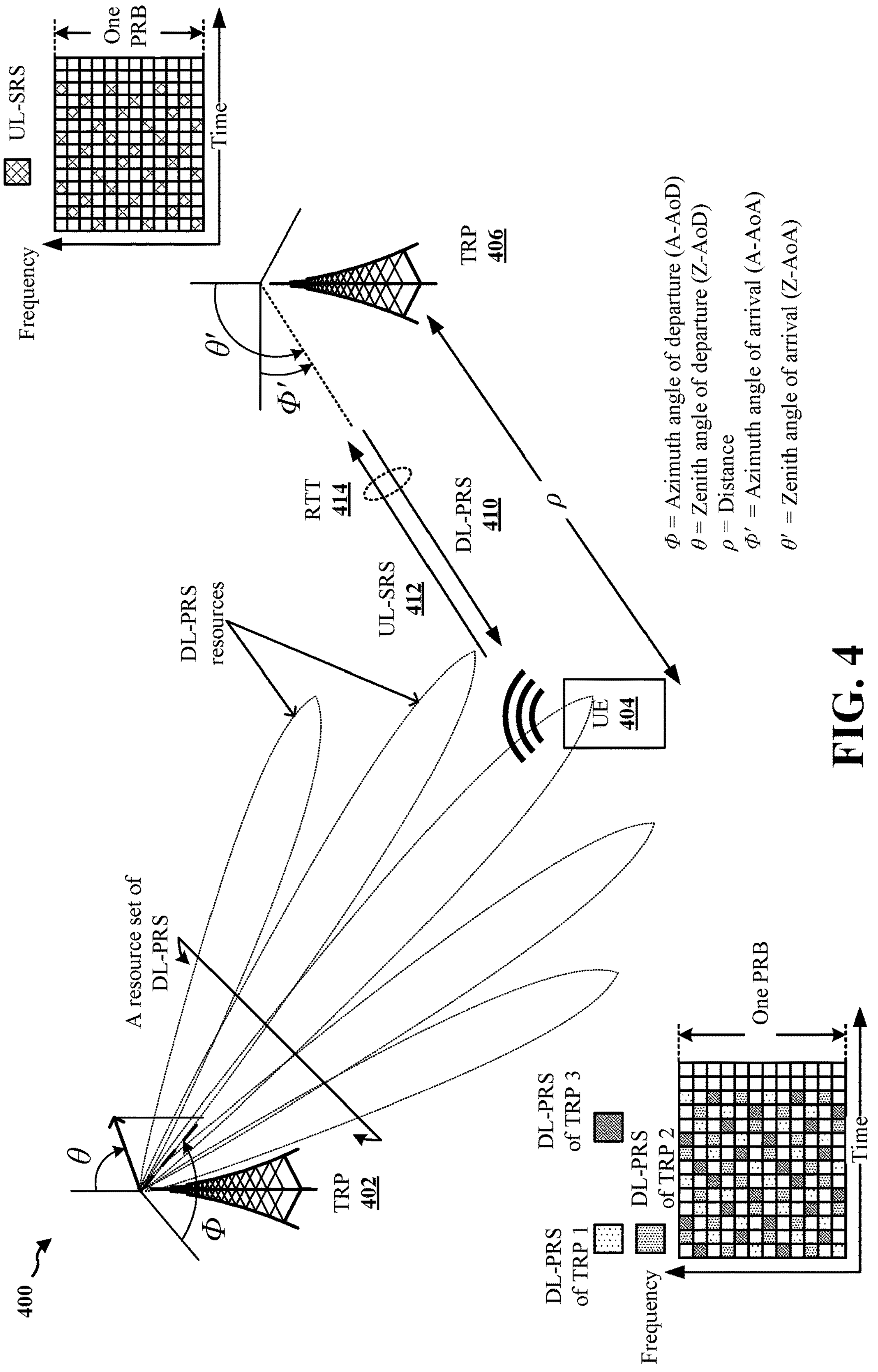
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS. SSS. SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning. PTRS) may be referred to as an "UL-PRS." In addition, for signals that may be transmitted in both the uplink and downlink (e.g., DMRS. PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

In addition to Global Navigation Satellite Systems (GNSS)-based positioning and network-based positioning (e.g., as described in connection with FIG. 4), various camera-based positioning has also been developed to provide alternative/additional positioning mechanisms/modes. Camera-based positioning, which may also be referred to as "camera-based visual positioning," "visual positioning" and/or "vision-based positioning," is a positioning mechanism/mode that uses images captured by at least one camera to determine the location of a target (e.g., a UE or a transportation that is equipped with the at least one camera, an object that is in view of the at least one camera, etc.). For example, images captured by the dashboard camera (dash cam) of a vehicle may be used for calculating the three-dimensional (3D) position and/or 3D orientation of the vehicle while the vehicle is moving. Similarly, images captured by the camera of a mobile device may be used for estimating the location of the mobile device user or the location of one or more objects in the images. In another example, a camera (or a UE) may determine its position by matching object(s) in images captured by the camera with object(s) in a map (e.g., a high-definition (HD) map), such as specified buildings, landmarks, etc. In some implementations, camera-based positioning may provide centimeter-level and 6-degrees-of-freedom (6DOF) positioning. 6DOF may refer to a representation of how an object moves through 3D space by either translating linearly or rotating axially (e.g., 6DOF=3D position+3D attitude). For example, a single-degree-of-freedom on an object may be controlled by the up/down, forward/back, left/right, pitch, roll, or yaw. Camera-based positioning has a great potential for various applications, especially in satellite signal (e.g., GNSS/GPS signal) degenerated/unavailable environments and/or for autonomous driving.

In some scenarios, images captured by a camera may also be used for improving the accuracy/reliability of other positioning mechanisms/modes (e.g., the GNSS-based positioning, the network-based positioning, etc.), which may be referred to as "vision-aided positioning," "camera-aided positioning," "camera-aided location," and/or "camera-aided perception," etc. For example, while GNSS and/or inertial measurement unit (IMU) may provide good positioning/localization performance, when GNSS measurement outage occurs, the overall positioning performance might degrade due to IMU bias drifting. Thus, images captured by the camera may provide valuable information to reduce errors. For purposes of the present disclosure, a positioning session (e.g., a period of time in which one or more entities are configured to determine the position of a UE) that is associated with camera-based positioning or camera-aided positioning may be referred to as a camera-based positioning session or a camera-aided positioning session. In some examples, the camera-based positioning and/or the camera-aided positioning may be associated with an absolute position of the UE, a relative position of the UE, an orientation of the UE, or a combination thereof.

Figure 5:
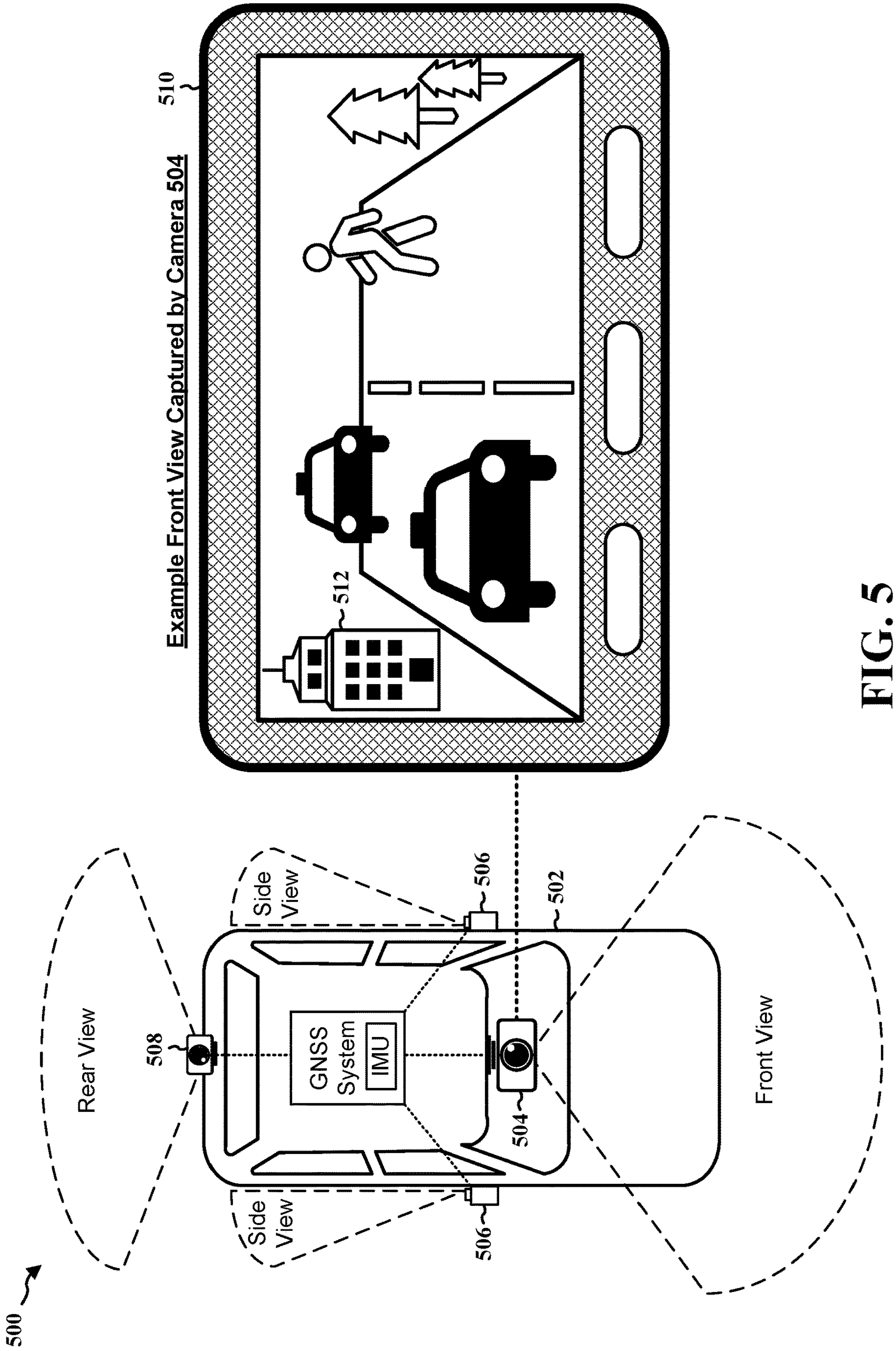
FIG. 5 is a diagram illustrating an example of camera-aided positioning in accordance with various aspects of the present disclosure.

FIG. 5 is a diagram 500 illustrating an example of camera-aided positioning in accordance with various aspects of the present disclosure. A vehicle 502 may be equipped with a GNSS system and a set of cameras, which may include a front camera 504 (for capturing the front view of the vehicle 502), side cameras 506 (for capturing the side views of the vehicle 502), and/or a rear camera 508 (for capturing the front view of the vehicle 502), etc. In some examples, the GNSS system may further include or be associated with at least one IMU (e.g., a GNSS+IMU system). While FIG. 5 uses the vehicle 502 as an example, it is merely for illustration purposes. Aspects presented herein may also apply to other types of transportations (e.g., motorcycles, bicycles, buses, trains, etc.), devices (e.g., UEs on pedestrians), and/or positioning mechanisms/modes (e.g., network-based positioning described in connection with FIG. 4). In addition, for purposes of the present disclosure, a positioning mechanism/mode (e.g., GNSS-based positioning, network-based positioning, etc.) that uses at least one sensor (e.g., an IMU, a camera) to assist the positioning may be referred to as a sensor fusion positioning.

The GNSS system may estimate the location of the vehicle 502 based on receiving GNSS signals transmitted from multiple satellites (e.g., based on performing GNSS-based positioning). However, when the GNSS signals are not available or weak, such as when the vehicle 502 is in an urban area or in a tunnel, the estimated location of the vehicle 502 may become inaccurate. Thus, in some implementations, the set of cameras on the vehicle 502 may be used for assisting the positioning, such as for verifying whether the location estimated by the GNSS system based on the GNSS signals is accurate. For example, as shown at 510, images captured by the front camera 504 of the vehicle 502 may include/identify a specific building 512 (which may also be referred to as a feature) that is with a known location, and the vehicle 502 (or the GNSS system or a positioning engine associated with the vehicle 502) may determine/verify whether the location (e.g., the longitude and latitude coordinates) estimated by the GNSS system is in proximity to the known location of this specific building 512. Thus, with the assistance of the camera(s), the accuracy and reliability of the GNSS-based positioning may be further improved. For purposes of the present disclosure, a GNSS system that is associated with a camera (e.g., capable of performing camera-aided/based positioning) may be referred to as a "GNSS+camera system," or a "GNSS+IMU+camera system" (if the GNSS system is also associated with/includes at least one IMU).

In some examples, a software or an application that accepts positioning related measurements from GNSS chipsets and/or sensors to estimate position, velocity, and/or altitude of a device may be referred to as a positioning engine. In addition, a positioning engine that is capable of achieving certain high level of accuracy (e.g., centimeter/decimeter level accuracy) and/or latency may be referred to as a precise positioning engine (PPE). For example, a positioning engine that is capable of performing real-time kinematic positioning (RTK) (e.g., receiving or processing correction data associated with RTK) may be considered as a PPE. Another example of PPE is a positioning engine that is capable of performing precise point positioning (PPP). PPP is a positioning technique that removes or models GNSS system errors to provide a high level of position accuracy from a single receiver.

In some examples, a software or an application that accepts positioning related measurements from global navigation satellite system (GNSS)/global positioning system (GPS) chipsets and/or sensors to estimate position, velocity, and/or altitude of a device may be referred to as a positioning engine (PE). In addition, a positioning engine that is capable of achieving certain high level of accuracy (e.g., centimeter/decimeter level accuracy) and/or latency may be referred to as a precise positioning engine (PPE). On the other hand, a navigation application may refer to an application in a user equipment (e.g., a smartphone, an in-vehicle navigation system, a GPS device, etc.) that is capable of providing navigational directions in real time. Over the last few years, users have increasingly relied on navigation applications because they have provided various benefits. For example, navigation applications may provide convenience to users as they enable users to find a way to their destinations, and also allow users to contribute information and mark places of importance thereby generating the most accurate description of a location. In some examples, navigation applications are also capable of providing expert guidance for users, where a navigation application may guide a user to a destination via the best, most direct, or most time-saving routes. For example, a navigation application may obtain the current status of traffic, and then locate a shortest and fastest way for a user to reach a destination, and also provide approximately how long it will take the user to reach the destination. As such, a navigation application may use an Internet connection and a GPS/GNSS navigation system to provide turn-by-turn guided instructions on how to arrive at a given destination.

Figure 6:
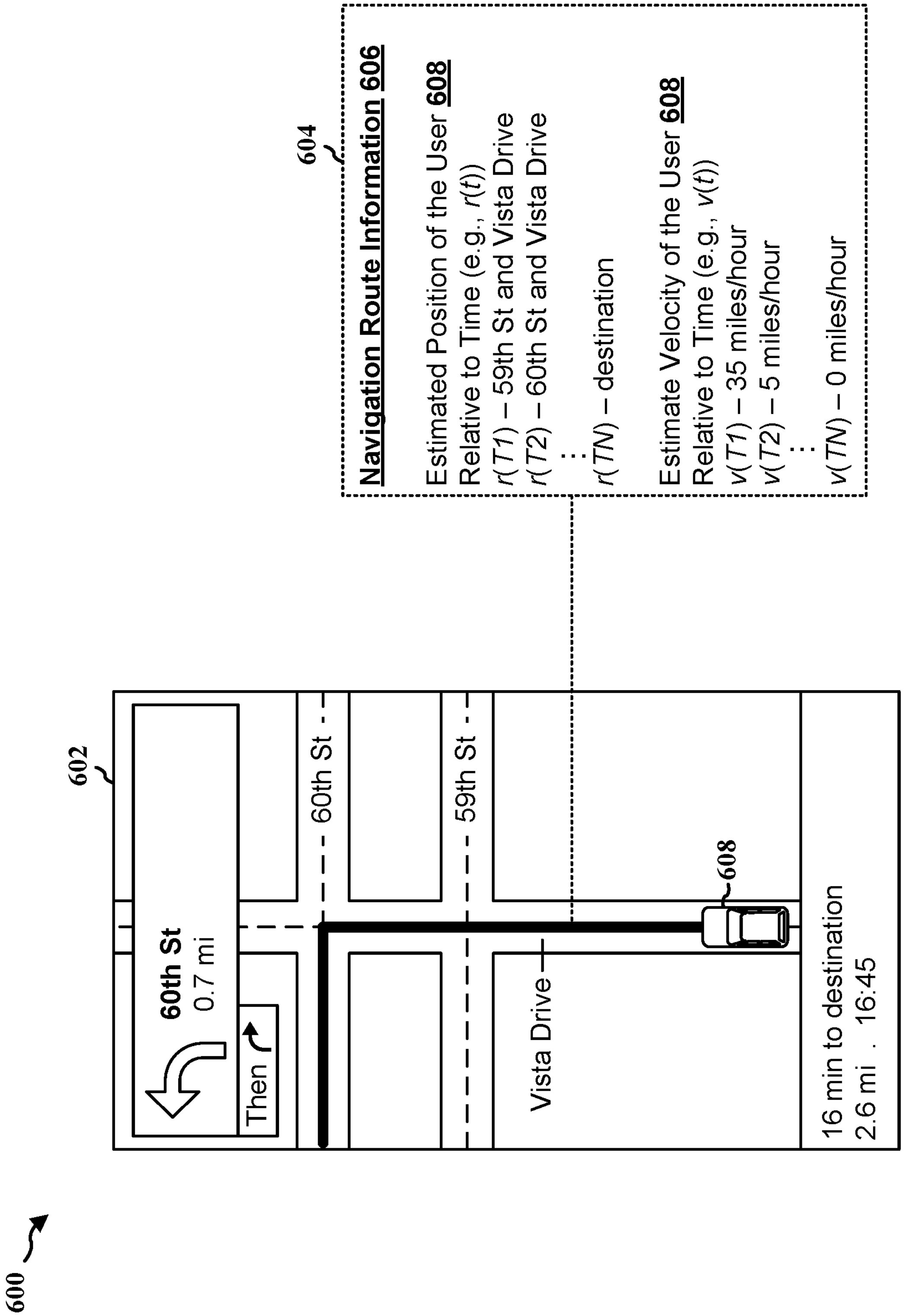
FIG. 6 is a diagram illustrating an example of a navigation application in accordance with various aspects of the present disclosure.

FIG. 6 is a diagram 600 illustrating an example of a navigation application in accordance with various aspects of the present disclosure. As shown at 602, a navigation application, which may be running on a UE such as a vehicle (e.g., a built-in GPS/GNSS system of the vehicle) or a smartphone, may provide a user (e.g., via a display or an interface) with turn-by-turn directions to a destination and an estimated time to reach the destination based on real-time information. For example, the navigation application may receive/download real-time traffic information, road condition information, local traffic rules (e.g., speed limits), and/or map information/data from a server. Then, the navigation application may calculate a route to the destination based on at least the map information and other available information. The map information may include the map of the area in which the user is traveling, such as the streets, buildings, and/or terrains of the area, or a map that is compatible with the navigation application and GPS/GNSS system. In some examples, the route calculated by the navigation application may be the shortest or the fastest route. For purposes of the present disclosure, information associated with this calculated route may be referred to as navigation route information. For example, navigation route information may include predicted/estimated positions, velocities, accelerations, directions, and/or altitudes of the user at different points in time.

For example, as shown at 604, based on the map information, the speed limit, and the real-time road condition information, the navigation application may generate navigation route information 606 that guides a user 608 to a destination. In some examples, the navigation route information 606 may include the position of the user and velocity of the user relative/respect to time, which may be denoted as $\vec{r}(t)$ and $\vec{v}(t)$, respectively. For example, the navigation application may estimate that at a first point in time (T1), the user may reach a first point/place with certain speed (e.g., the intersection of 59th Street and Vista Drive with a velocity of 35 miles per hour), and at a second point in time (T2), the user may reach a second point/place with certain speed (e.g., the intersection of 60th Street and Vista Drive with a velocity of 15 miles per hour), and up to $N^{th}$ point in time (TN), etc.

In recent years, vehicle manufacturers have been developing vehicles with assisted driving and/or autonomous driving capabilities. Assisted driving, which may also be called advanced driver assistance systems (ADAS), may refer to a set of technologies designed to enhance vehicle safety and improve the driving experience by providing assistance and automation to the driver. These technologies may use various sensor(s), camera(s), and other components to monitor a vehicle's surroundings and assist the driver of the vehicle with certain driving tasks. For example, some features of assisted driving systems may include: (1) adaptive cruise control (ACC) (e.g., a system that automatically adjusts a vehicle's speed to maintain a safe following distance from the vehicle ahead), (2) lane-keeping assist (LKA) (e.g., a system that uses cameras to detect lane markings and helps keep the vehicle centered within the lane, and provides steering inputs to prevent unintentional lane departure), (3), autonomous emergency braking (AEB) (e.g., a system that detects potential collisions with obstacles or pedestrians and automatically apply the brakes to avoid or mitigate the impact), (4) blind spot monitoring (BSM) (e.g., a system that uses sensors to detect vehicles in a driver's blind spots and provides visual or audible alerts to avoid potential collisions during lane changes), (5) parking assistance (e.g., a system that assists drivers in parking their vehicles by using camera(s) and sensor(s) to help with parallel parking or maneuvering into tight spaces), and/or traffic sign recognition (e.g., camera(s) and image processing are used to recognize and display traffic signs such as speed limits, stop signs, and other road regulations on the vehicle's dashboard).

Autonomous driving, which may also be called as self-driving or driverless technology, may refer to the ability of a vehicle to navigate and operate itself without specifying human intervention (e.g., without a human controlling the vehicle). The goal of the autonomous driving is to create vehicles that are capable of perceiving their surroundings, making decisions, and controlling their movements, all without the direct involvement of a human driver. To achieve or improve the autonomous driving, a vehicle may be specified to use a map (or map data) with detailed information, such as a high-definition (HD) map. An HD map may refer to a highly detailed and accurate digital map designed for use in autonomous driving and advanced driver assistance systems (ADAS). In one example, HD maps may typically include one or more of: (1) geometric information (e.g., precise road geometry, including lane boundaries, curvature, slopes, and detailed 3D models of the surrounding environment), (2) lane-level information (e.g., information about individual lanes on the road, such as lane width, lane type (e.g., driving, turning, or parking lanes), and lane connectivity), (3) road attributes (e.g., data on road features like traffic signs, signals, traffic lights, speed limits, and road markings), (4) topology (e.g., information about the relationships between different roads, intersections, and connectivity patterns), (5) static objects (e.g., locations and details of fixed objects along the road, such as buildings, traffic barriers, and poles), (6) dynamic objects (e.g., real-time or frequently updated data about moving objects, like other vehicles, pedestrians, and cyclists), and/or (7) localization and positioning: precise reference points and landmarks that help in accurate vehicle localization on the map, etc.

Figure 7:
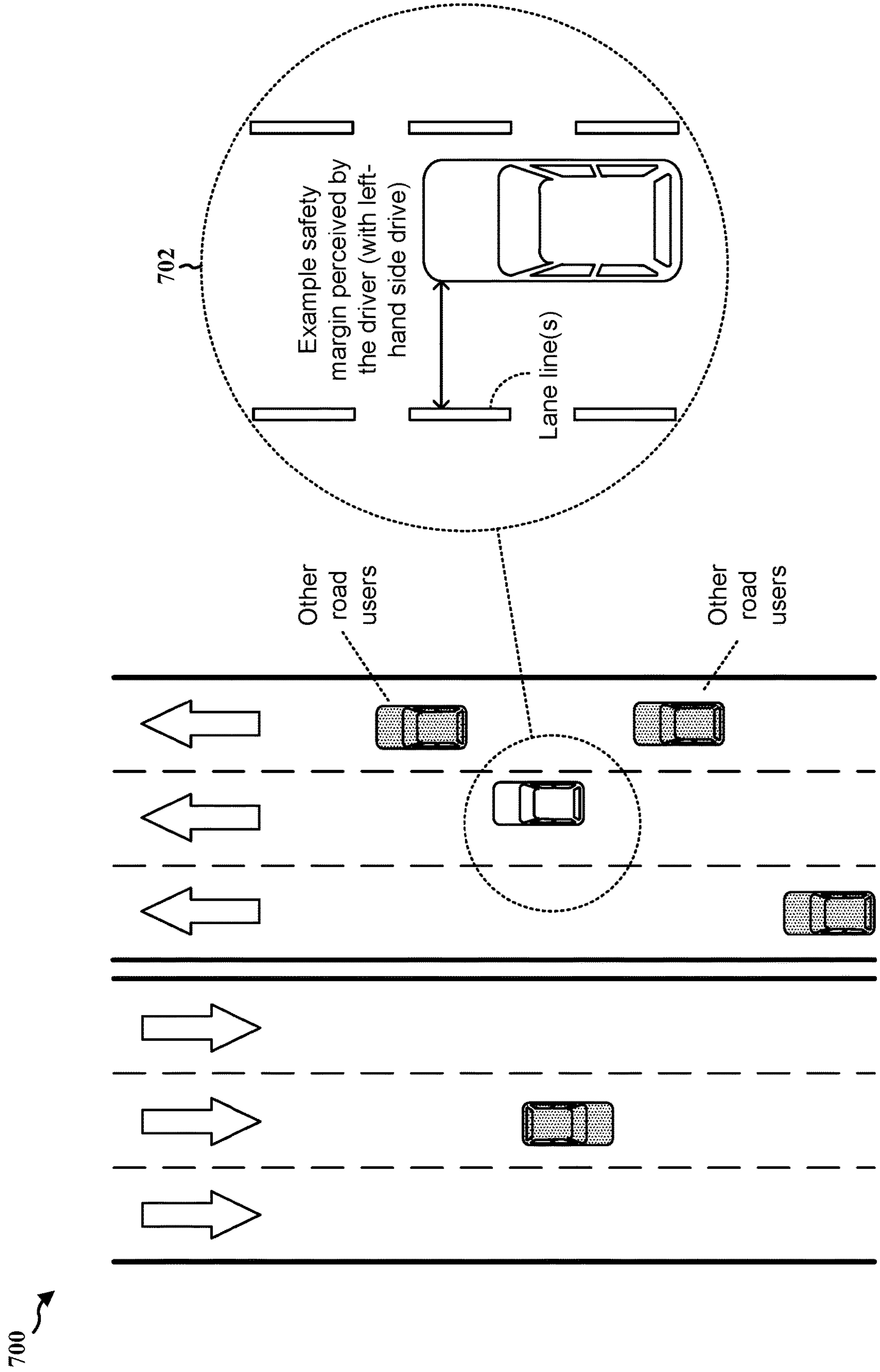
FIG. 7 is a diagram illustrating an example driving behavior of a typical driver in accordance with various aspects of the present disclosure.

FIG. 7 is a diagram 700 illustrating an example driving behavior of a typical driver in accordance with various aspects of the present disclosure. In some scenarios, some drivers may tend to drive closer to other road users (e.g., to other vehicles) than what is actually safe. For example, as shown at 702, a driver of a left-hand side drive vehicle may perceive safety distance(s) between his/her vehicle and other lanes/vehicles by visually estimating the distance between his/her vehicle and the other vehicles, and/or between his/her vehicle and the closest lane line(s) (which may also be referred to as polyline(s) in some examples) the driver is able to observe, which may result in the driver driving closer to other vehicles when such visual estimation/perception is inaccurate. In another example, a new driver, a driver with less driving experience, a driver switching to a different car (e.g., switching to a larger/smaller vehicle), and/or a driver new to an area (e.g., typically to a denser urban environment) may often struggle with spatial awareness and/or accurate conception of vehicle size, which may also cause these drivers to drive closer to other vehicles/objects than what is actually safe. Similarly, rural road environments with tight/unusual barriers (e.g., hedges, corn stalks, etc.) may also lead drivers to intuitively keep as much distance as possible from them, which may result in the driver driving too close to other vehicles/objects. Such behavior may be hazardous to other road users, such as motorcycles, bicycles, and/or power two-wheelers.

For purposes of the present disclosure, in the context of driving, a safety margin may refer to a space or a distance maintained between a vehicle and other vehicles, objects, or potential hazards on the road. A safety margin may enable typical drivers to have sufficient or extra time and space to react to unexpected situations and avoid collisions. The amount/distance of safety margins may vary depending on the context. For example, there may be several types of safety margins in driving, which may include safety margins for following distance (e.g., the space/distance between a vehicle and another vehicle in front of that vehicle), safety margins for side clearance (e.g., the space distance between a vehicle and objects, such as guardrails, parked cars, or cyclists on the side of the road), safety margins for passing distance (e.g., when a vehicle is overtaking another vehicle), safety margins for intersection space (e.g., the space/distance between a vehicle and an intersection that enables the driver of the vehicle to have a better visibility and time to react if other drivers fail to obey traffic signals or stop signs at the intersection), and/or safety margins for emergency stopping distance (e.g., the distance/space specified to bring a vehicle to a complete stop in an emergency situation), etc. As appropriate safety margins may vary based on driving conditions, speed, weather, and road layout, drivers may be specified to adjust their overall safety margins according to these factors.

Figure 8:
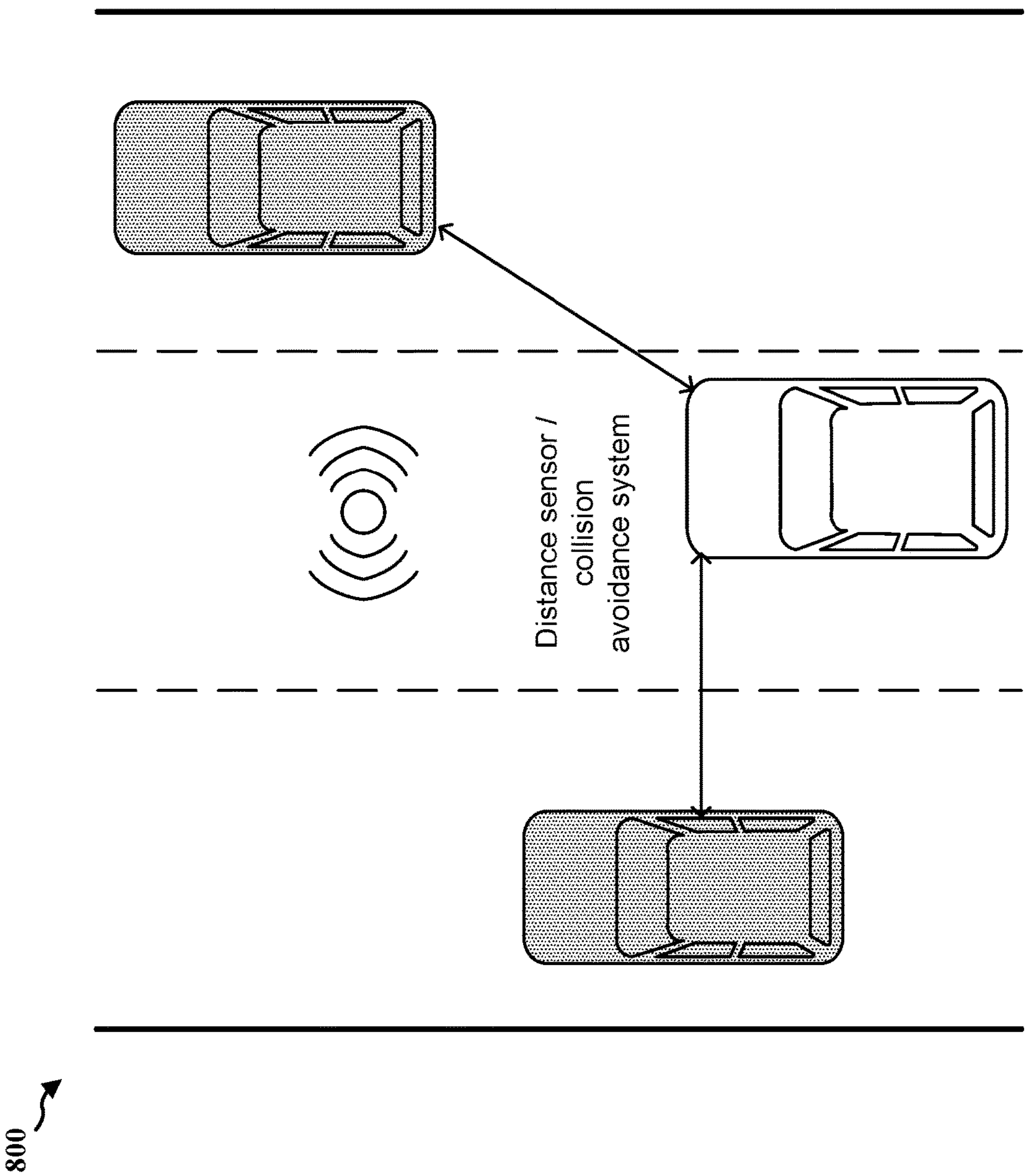
FIG. 8 is a diagram illustrating an example collision avoidance system in accordance with various aspects of the present disclosure.

FIG. 8 is a diagram 800 illustrating an example collision avoidance system in accordance with various aspects of the present disclosure. Some vehicles may include a collision avoidance system, which uses one or more sensors (e.g., camera(s), Lidar(s), radar(s), ultrasonic sensor(s), etc.) to detect distance between a vehicle and other objects (e.g., other vehicles, objects, pedestrians, obstacles, walls, etc.), and alarms their drivers and/or stops (or slows down) the vehicles when the detected distance is below a distance threshold. In other words, a collision avoidance system may be a warning system that is capable of preventing accidents by assisting drivers in avoiding potential collisions with other vehicles, pedestrians, or obstacles on the road.

However, after a collision avoidance system is activated/triggered, it typically does not indicate to the driver why it is being activated/triggered. For example, when a driver hears an alarming beeping sound generated by a collision avoidance system, the driver may just know that the vehicle is too close to one or more objects, but the driver may not be able to immediate identify the object(s) and/or its actual distance to the object(s), such as when the driver observes multiple object(s) (e.g., vehicles) around the driver's vehicle. Therefore, the driver may not be able to learn the safety margin between its vehicle and other objects. In addition, such alarming sound may cause confusions to some drivers if they are not able to identify the cause of the alarming sound.

Aspects presented herein may improve the road safety by enabling drivers to visualize safety margins for objects around the drivers. Aspects presented herein may also enable drivers to know the distances and safety margins between their vehicles and other objects, thereby enabling the drivers to learn the safety distances around their vehicles. In one aspect of the present disclosure, as visualizations on head-down displays (e.g., vehicle backup camera system) have been beneficial to indicate system logic and affect driving behaviors of drivers, visualization modules such as an augmented reality (AR) display or an extended reality (XR) display may be used to enable drivers to visualize safety margins for objects around their vehicles ahead of time (e.g., via the windshield of the vehicle), thereby enabling improved road safety learning and/or driver coaching for the drivers.

For purposes of the present disclosure, an AR or an AR device may refer to a technology that integrates/combines virtual contents with the real world. For example, an AR device may be a piece of glass (e.g., smart glasses, smart windshield, etc.) that enable users to see and interact with digital elements superimposed onto their physical environment. An AR device may be associated with various sensors, cameras, and processing units to understand a user's surroundings and accurately overlay digital objects or information on top of the real world. This may enable the user to experience a seamless integration of virtual and physical elements, enhancing their perception of reality.

Figure 9:
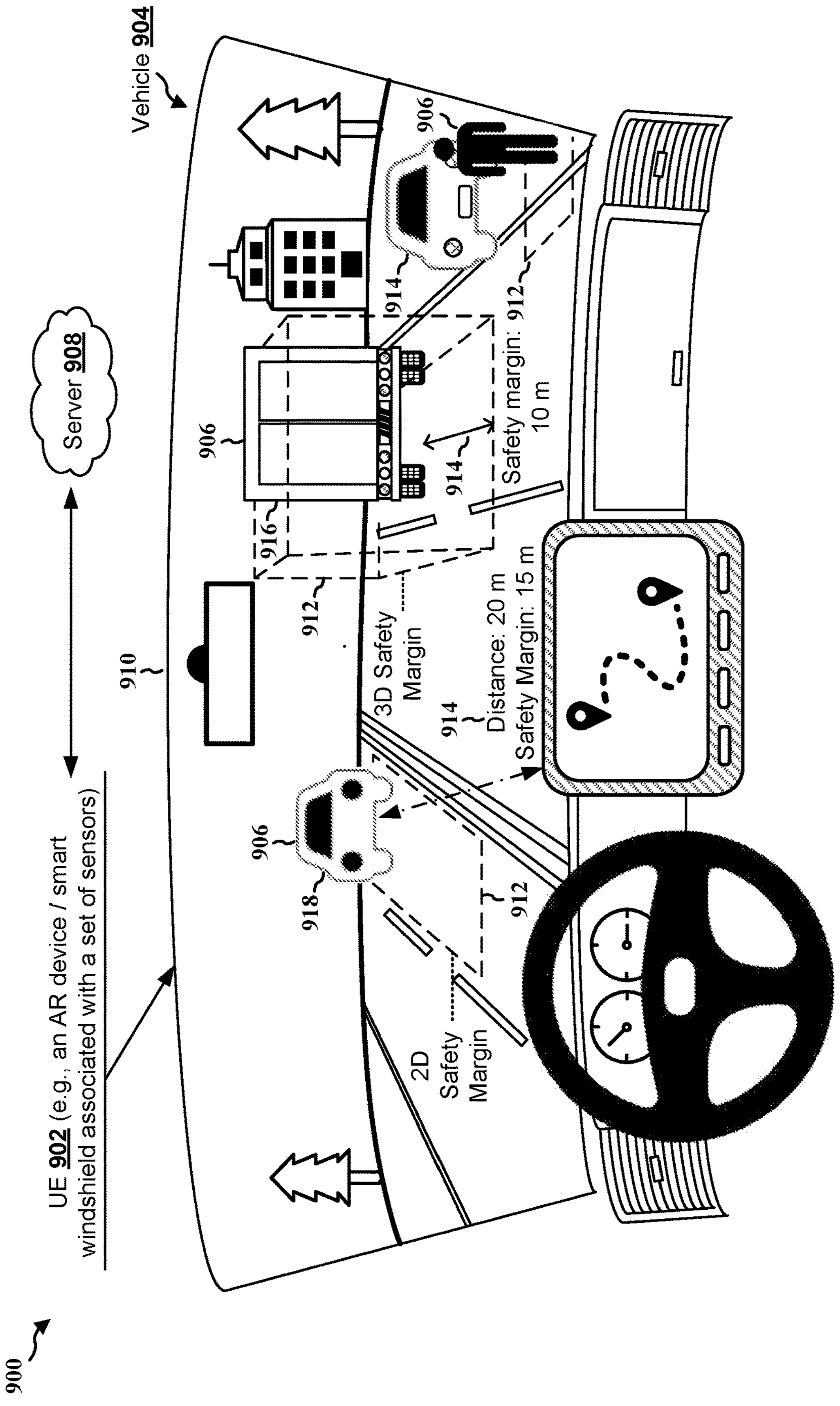
FIG. 9 is a diagram illustrating an example of displaying safety margins around objects and also between a vehicle and the objects via an AR display in accordance with various aspects of the present disclosure.

FIG. 9 is a diagram 900 illustrating an example of displaying safety margins around objects and also between a vehicle and the objects via an AR display in accordance with various aspects of the present disclosure. Devices that are capable of providing AR via a windshield of a vehicle, such as by displaying virtual contents on the windshield, may collectively be referred to as a user equipment (UE) 902. For example, the UE 902 may be a vehicle, an on-board unit (OBU) of the vehicle, an advanced driver assistance systems (ADAS) of the vehicle, an AR device or an AR display module (e.g., a smart windshield), an extended reality (XR) display module, a virtual reality (VR) display module, a head-up display (HUD) associated with a set of sensors (e.g., camera(s), Lidar(s), radar(s), ultrasonic sensor(s), etc.), a visualization display module, or a combination thereof.

In one aspect of the present disclosure, as shown at 910, the UE 902 may be configured to provide safety margin visualization assistance to a user (e.g., the driver) of a vehicle 904 by displaying safety margins around objects and/or between the vehicle and the objects. In some examples, the vehicle 904 may be referred to as an ego vehicle. An ego vehicle, in the context of autonomous driving or self-driving cars, may refer to a vehicle that contains the autonomous driving system and is responsible for making decisions and controlling its movements.

In one example, as shown at 912, the UE 902 may display safety margin(s) around object(s) in a set of objects 906 that are within a threshold distance of the vehicle 904 (e.g., within X meters of the UE 902). The safety margins may be configured to be two-dimensional (2D) and/or three-dimensional (3D). In another example, as shown at 914, the UE 902 may display a distance between the vehicle 904 and an object, a (recommended) safety margin between the vehicle 904 and/or the object, and/or the size of the safety margin around the set of objects 906, etc. This information may enable the driver of the vehicle 904 to learn the safety distances/margins and spatial perceptions between the vehicle 904 and the set of objects 906. In another example, the safety margin may be a defined (minimum) distance between the UE 902 and an object, and the UE 902 may display the current distance between the UE 902 and the object and the safety margin between the UE 902 and the object.

The set of objects 906 may include other vehicle(s), pedestrian(s), animal(s), road curb(s), median(s) (e.g., a dividing structure or strip located in the middle of a road to separate two-way lanes, preventing vehicles traveling on lanes going in the opposite direction from colliding), lane line(s), and/or divider(s), etc. For example, the display may include a current/estimated distance between the vehicle 904 and an object (e.g., 20 meters), and also include a safety margin around the object (e.g., 10 meters). In another example, the UE 902 may highlight an object when the distance between the vehicle 904 and the object is below a safety margin threshold, such as when the vehicle 904 is within the safety margins of the set of objects 906. For example, the UE 902 may create a two-dimensional (2D) or a three-dimensional (3D) bounding box around an object or highlight the object with a specified color. In some examples, different colors may also indicate different levels of safety margins. For example, a green color may indicate the vehicle 904 is outside the safety margin of an object (e.g., the distance between the vehicle 904 and an object is above the safety margin threshold, such as >10 meters or >70% of the safety margin of the object, etc.), whereas a red color may indicate the vehicle 904 is within the safety margin of an object (e.g., the distance between the vehicle 904 and the object is below the safety margin threshold, such as <5 meters or <35% of the safety margin of the object, etc.). In other examples, the UE 902 may display the safety margins via a tactile module (e.g., by providing physical alerts for safety margins) and/or a sound module (e.g., by displaying sounds for safety margins). For example, the UE 902 may activate a vibration or a beeping sound when the vehicle 904 is within the safety margin of a nearby object.

The UE 902 may provide the safety margin visualization assistance to a user based on a request from the user or an application. For example, the UE 902 may receive, from a user input or an application, a request to provide the safety margin visualization assistance. Based on the request, the UE 902 may calculate or obtain safety margins for the set of objects 906. Then, the UE 902 may output the calculated/obtained safety margins associated with the set of objects 906, such as by displaying the safety margins for the set of objects 906 via at least one type of display/notification module as shown at 910 and 912.

In some examples, the calculation of the safety margins may be performed by the UE 902. For example, the UE 902 may detect an object using at least one of its sensors, such as detecting the size of the object, the speed of the object, the location (e.g., relative location or absolute location) of the object, the direction of the object, and/or the movement pattern or predicted movement of the object, etc. Then, the UE 902 may compute the safety margin for the object based on the detected information.

In other examples, the calculation of the safety margins may be performed by a server 908, and the server 908 may transmit the calculated safety margins for the set of objects 906 to the UE 902. For example, the UE 902 may detect an object using at least one of its sensors, such as detecting the size of the object, the speed of the object, the location (e.g., relative location or absolute location) of the object, the direction of the object, and/or the movement pattern or predicted movement of the object, etc. Then, the UE 902 may provide this information to the server 908 and request the server 908 to calculate a safety margin for this object (or a request to provide the safety margin visualization assistance). In response, based on this information, the request, and other information associated with the UE 902 or the vehicle 904 (e.g., the location/speed/size/direction of the vehicle 904), the server 908 may compute the safety margins for the object, and the server 908 may provide or configure the computed safety margin for the object to the UE 902.

In some implementations, the calculation of the safety margins (at the UE 902 and/or at a server 908) may be performed utilizing at least one machine learning (ML) or artificial intelligence (AI) (ML/AI) model. An ML/AI model may refer to a computational algorithm or mathematical representation designed to learn patterns and make predictions from data. ML/AI models may use various data as input to automatically improve their performance on a specific task over time without being explicitly programmed to do so.

In some implementations, the calculation of the safety margins (at the UE 902 and/or at the server 908) may be further based on additional information (e.g., in addition to information related to the set of objects 906 and/or the vehicle 904). For example, the UE 902 or the server 908 may calculate the safety margins for the set of objects 906 further based on driver information associated with the driver, such as the attentiveness level of the driver, the suitable or desired safety margin threshold provided by the driver, the past driving behavior of the driver, or a combination thereof. Thus, a driver with better driving history may specify a shorter safety margin for an object compared to a driver with dangerous driving history. In some implementations, the UE 902 or the server 908 may calculate the safety margins for the set of objects 906 further based on the driver behavior and/or intervention. For example, if a driver is currently driving fast (e.g., above the speed limit) and/or changing lanes (e.g., steering the wheel) frequently, the UE 902 or the server 908 may modify (e.g., extend) the safety margin of one or more objects. In another example, if the driver of an ego vehicle (e.g., an autonomous driving vehicles) has a tendency to intervene the automatic driving (e.g., to perform manual controls), the UE 902 or the server 908 may also determine to modify (e.g., extend) the safety margin of one or more objects.

In another example, the UE 902 or the server 908 may calculate the safety margins for the set of objects 906 further based on environmental information, such as environmental information that is within a defined range of the UE 902. The environmental information may include the road friction, one or more road boundaries, one or more obstacles, a hazard condition, a lighting condition surrounding the UE 902, and/or a weather condition surrounding the UE 902, etc. For example, the safety margin for an object may be longer/larger under an adverse weather condition (e.g., under a rainy day or a snow day) and/or when the road travelled by the UE 902 is under construction.

In another example, the UE 902 or the server 908 may calculate the safety margins for the set of objects 906 further based on traffic information. The traffic information may include the current traffic condition ahead of a travelling direction of the UE 902, one or more objects or one or more obstacles ahead of the travelling direction of the UE 902, one or more traffic conditions provided by at least one other driver or at least one other UE (e.g., based on crowd-sourcing), a map or an updated map of the travelling direction of the UE (e.g., a high-definition (HD), a map that is associated with real-time road/traffic information), and/or collision information associated one or more paths or one or more vehicles. For example, the UE 902 may obtain real time information from a server, such as a map server, and the UE 902 may increase the safety margins for the set of objects 906 under a congested traffic condition compared to a smooth/non-congested traffic condition. In another example, the UE 902 or the server 908 may also be configured to estimate collision probabilities for the set of objects 906 or for one or more obstacles ahead of the travelling direction of the UE 902. The UE 902 may provide a larger safety margin for an object with a higher collision probability (e.g., objects that is likely in the travelling path of the UE 902) compared to an object with a lower collision probability (e.g., objects that are less likely to be in the travelling path of the UE 902). The estimated collision probabilities different objects may be used for calculating their corresponding safety margins, where objects with higher collision probabilities may have a larger/longer safety margins and/or objects with lower collision probabilities may have a smaller/shorter safety margins.

Figure 10:
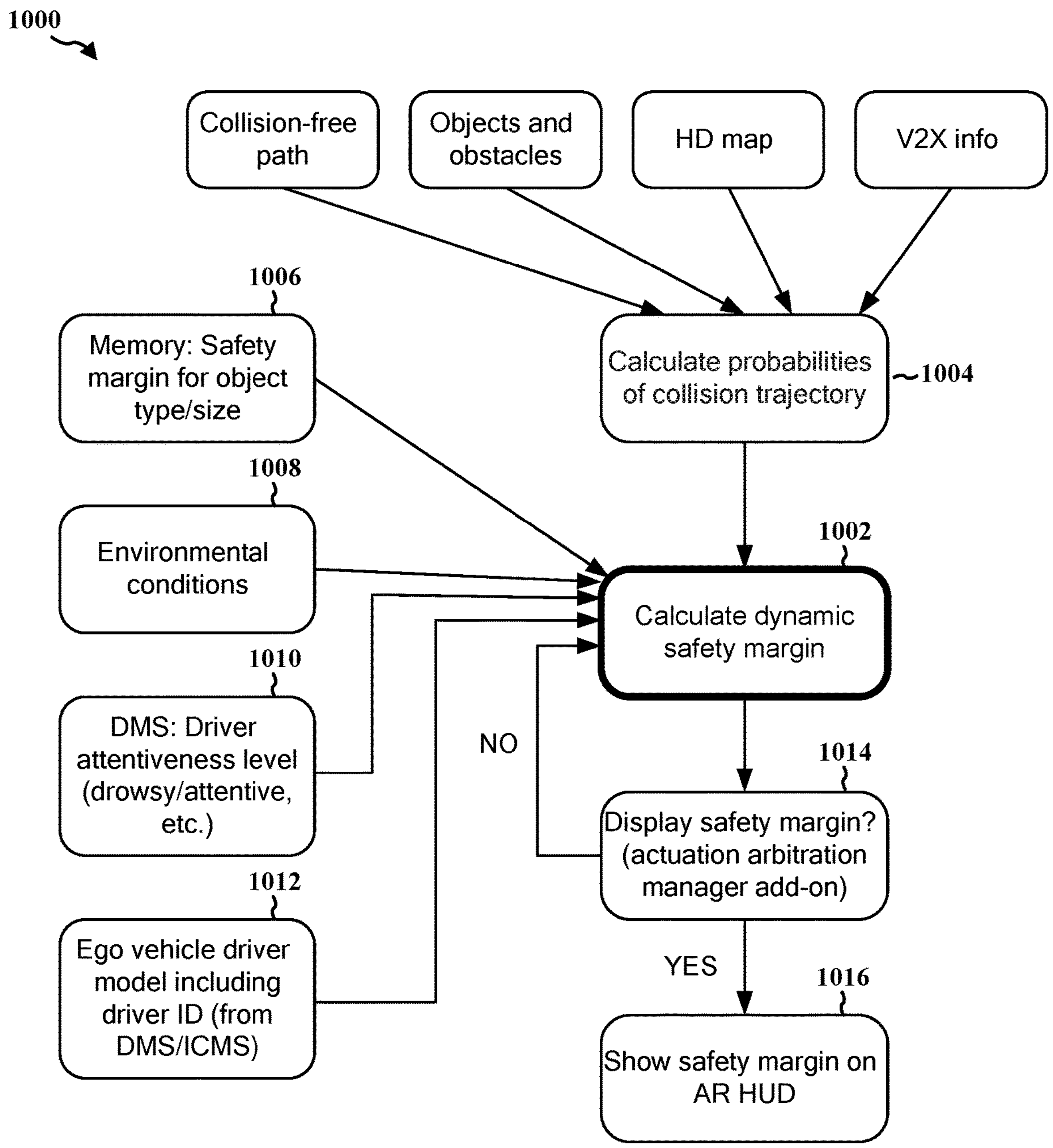
FIG. 10 is a diagram illustrating an example of integrating various information for calculating safe margins in accordance with various aspects of the present disclosure.

FIG. 10 is a diagram 1000 illustrating an example of integrating various information for calculating safe margins in accordance with various aspects of the present disclosure. Aspects presented herein may be integrated with vehicle ADAS or vehicle OBU.

As shown at 1002, a UE (e.g., the UE 902) or a server (e.g., the server 908) may be configured to calculate safety margins dynamically for one or more objects (e.g., the set of objects 906) surrounding the UE (e.g., objects within a threshold distance of the UE) and/or between the UE and the one or more objects based on a set of inputs, such as described in connection with FIG. 9.

In one example, as shown at 1004, the set of inputs may include probabilities of collision trajectory between a vehicle (e.g., the vehicle 904) and the one or more objects, and the probabilities of collision trajectory may be calculated based on information related to collision-free path, information related to the one or more objects and obstacles surrounding the one or more objects, information obtained from a map/map data (e.g., HD map/HD map data), and/or information from other users (e.g., received via sidelink, vehicle-to-everything (V2X), and/or vehicle-to-vehicle (V2V) communication(s) from external entities), etc. For example, referring back to FIG. 9, the UE 902 may calculate the probabilities of collision trajectory for the set of objects 906, and the UE 902 may determine that the probabilities of collision for a parked vehicle 914 is lower than the probabilities of collision for a truck 916 and/or an incoming vehicle 918. In addition, the probabilities of collision may also be higher for the truck 916 compared to the incoming vehicle 918 as the parked vehicle 914 is close to the lane travelled by the truck 916, which may cause the driver of the truck 916 to drive the truck 916 closer to the left of its lane. As such, the truck 916 may have a higher probability to move across into the lane of the vehicle 904. Based on this calculated probability, the UE 902 may calculate/determine a higher/larger safety margin for the truck 916 (compared to the incoming vehicle 918 and/or the parked vehicle 914, etc.). In other words, the safety margin for an object may also vary based on other objects surrounding the object.

In another example, as shown at 1006, the set of inputs may include (pre-defined or recorded) safety margins for different objects, which may be determined based on the type and/or the size of an object. For example, referring back to FIG. 9, the safety margin for a large object (e.g., an object exceeds a defined volume or matches a defined range of volumes) or a truck (e.g., a first type of object) may be higher compared to the safety margin for a small object (e.g., an object below a defined volume or matches a defined range of volumes) or a sedan (e.g., a second type of object) as the large object/truck may occupy more spaces on the road and typically travels slower and takes a longer time/distance to stop compared to a small object/sedan. In one example, the safety margins for different sizes and/or types of objects may be pre-defined, such as based on a mapping or a table (e.g., a first safety margin for volume/dimension <X, a second safety margin for volume/dimension ≥X and <Y, and a third safety margin for volume/dimension ≥Y and <Z, etc.). In another example, the safety margins for different sizes and/or types of objects may be based on a record (e.g., safety margins calculated for different objects in the past and stored in a memory).

In another example, as shown at 1008, the set of inputs may include environmental conditions, such as the road friction, the weather, road/traffic conditions, road boundaries, obstacles, the lighting conditions (e.g., at day, at night), etc. For example, under a rainy day or when the road friction is detected to be low (e.g., the road is wet or very dry with sands), the safety margin for an object may be larger compared to the safety margin for the object under a sunny day or when the road friction is normal.

In another example, as shown at 1010, the set of inputs may include the driver's attentiveness level. Some vehicles may include one or more sensors that are capable of detecting condition/information related to occupants (e.g., driver and passengers) in a vehicle, which may be referred to as an in-cabin monitoring system (ICMS) or a driver monitoring system (DMS) in some examples. Thus, the safety margin for an object may be higher/longer when the driver's attentiveness level is lower (e.g., the driver is detected to be drowsy) compared to when the driver's attentiveness level is higher.

In another example, as shown at 1012, the set of inputs may include information specific to a driver. For example, each driver may be associated with a driver ID that is linked to a set of information related to the driver, such as the driving history of the driver (e.g., whether the driver has collisions histories, driving under influence histories), the health condition of the driver (e.g., whether the driver is near/far-sighted or visually impaired at dark environments), the driving pattern of the driver (e.g., slow driver, fast driver, risky driver, etc.), and/or specifications provided by the driver (e.g., a custom safety margin provided by the driver), etc. Thus, the safety margins for objects may be higher/longer when the driver (or the corresponding driver ID) is associated with a risky driver behavior/profile compared to a normal/non-risky driver behavior/profile.

As shown at 1014, after the UE or the server calculates the safety margins for one or more objects surrounding the UE (e.g., within the threshold distance of the UE) and/or between the UE and the one or more objects, the UE or the server may also determine whether to display the safety margins (e.g., via a visual/AR/XR display module of the UE or the vehicle). In other words, the UE may be configured to selective displaying safety margins depending on the implementations. For example, the UE may be configured to display safety margins just for objects with probabilities of collision trajectory exceeding a probability threshold, or when the calculated safety margins are below/above a threshold or within a range, etc. As shown at 1016, if the UE determines that the safety margin for an object is to be displayed, the UE may display the safety margin for that object, such as via a display/AR/XR module as described in connection with FIG. 9. If the UE determines that the safety margin for an object is not to be displayed, the UE may skip displaying the safety margin for that object. The UE may be configured to continue and repeat this process (e.g., processes described in connection with 1002 and 1014) while the safety margin visualization assistance function is activated.

In some examples, the UE may also be configured to display safety margins for objects within a defined area. For example, the safety margins may be configured to be ego vehicle-focused that displays safety marginals for objects on the side of the road travelled by vehicle (e.g., do not display both sides). In another example, the safety margins may be dynamic within bounds, such as to highlight reckless drivers (e.g., determined on their vehicles' movements), vulnerable road users (VRUs), and/or unexpected road conditions, etc. based on the severity as safe looking roads may actually be dangerous and vice versa.

Figure 11B:
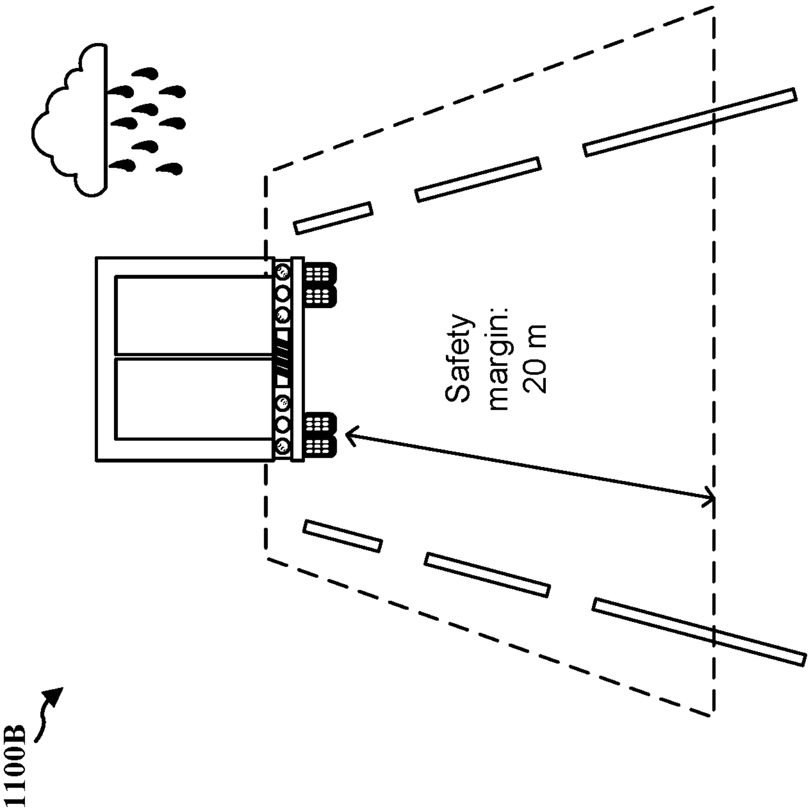
FIG. 11B is a diagram illustrating an example of dynamically adjusting safety margins of objects in accordance with various aspects of the present disclosure.
Figure 11A:
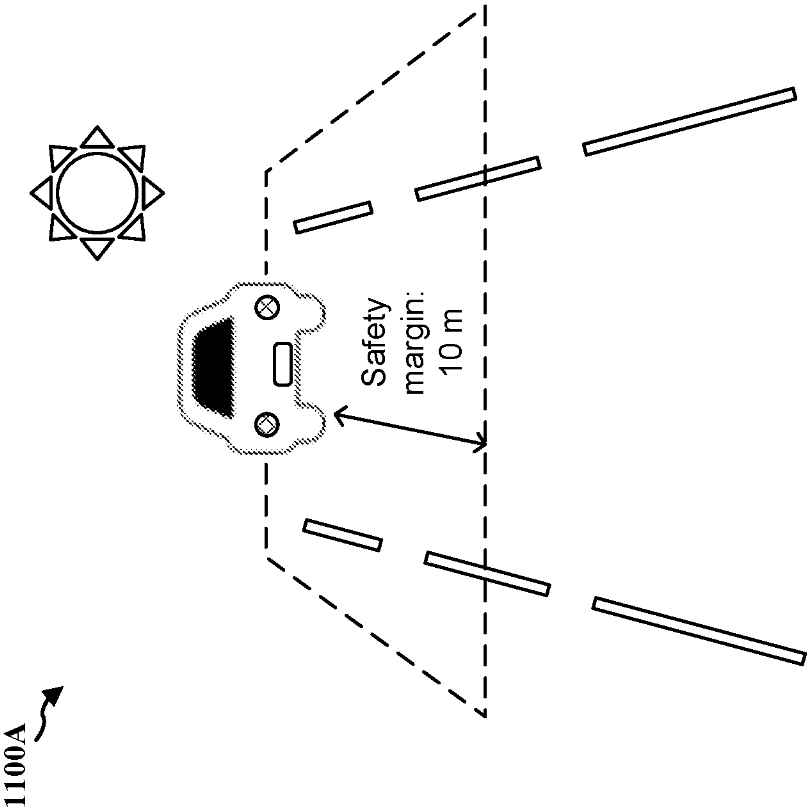
FIG. 11A is a diagram illustrating an example of dynamically adjusting safety margins of objects in accordance with various aspects of the present disclosure.

FIGS. 11A and 11B are diagrams 1100A and 1100B illustrating an example of dynamically adjusting safety margins of objects in accordance with various aspects of the present disclosure. As shown by the diagram 1100A, for a sedan (e.g., a vehicle within a first size range) or under a sunny day, the safety margin for the sedan may be pre-configured to be 10 meters. On the other hand, as shown by the diagram 1100B, for a truck (e.g., a vehicle within a first size range) or under a rainy day, the safety margin for the truck (or a sedan) may be dynamically expanded/switched to 20 meters. As such, the safety margins around objects may change dynamically based on conditions/severity surrounding the driver, such as based on weather, types of the vehicle, behavior of the drivers, VRUs, unexpected road conditions, etc.

In some configurations, the UE or the server may be associated with at least one AI/ML module/system that is capable of learning the desire of a driver for safety margins and adjust the safety margins for various objects accordingly (e.g., if it is safe to do so). Thus, the at least one AI/ML module/system may enable the UE or the server to dynamically adjust safety margins for objects in new/different environments for drivers.

Figure 12:
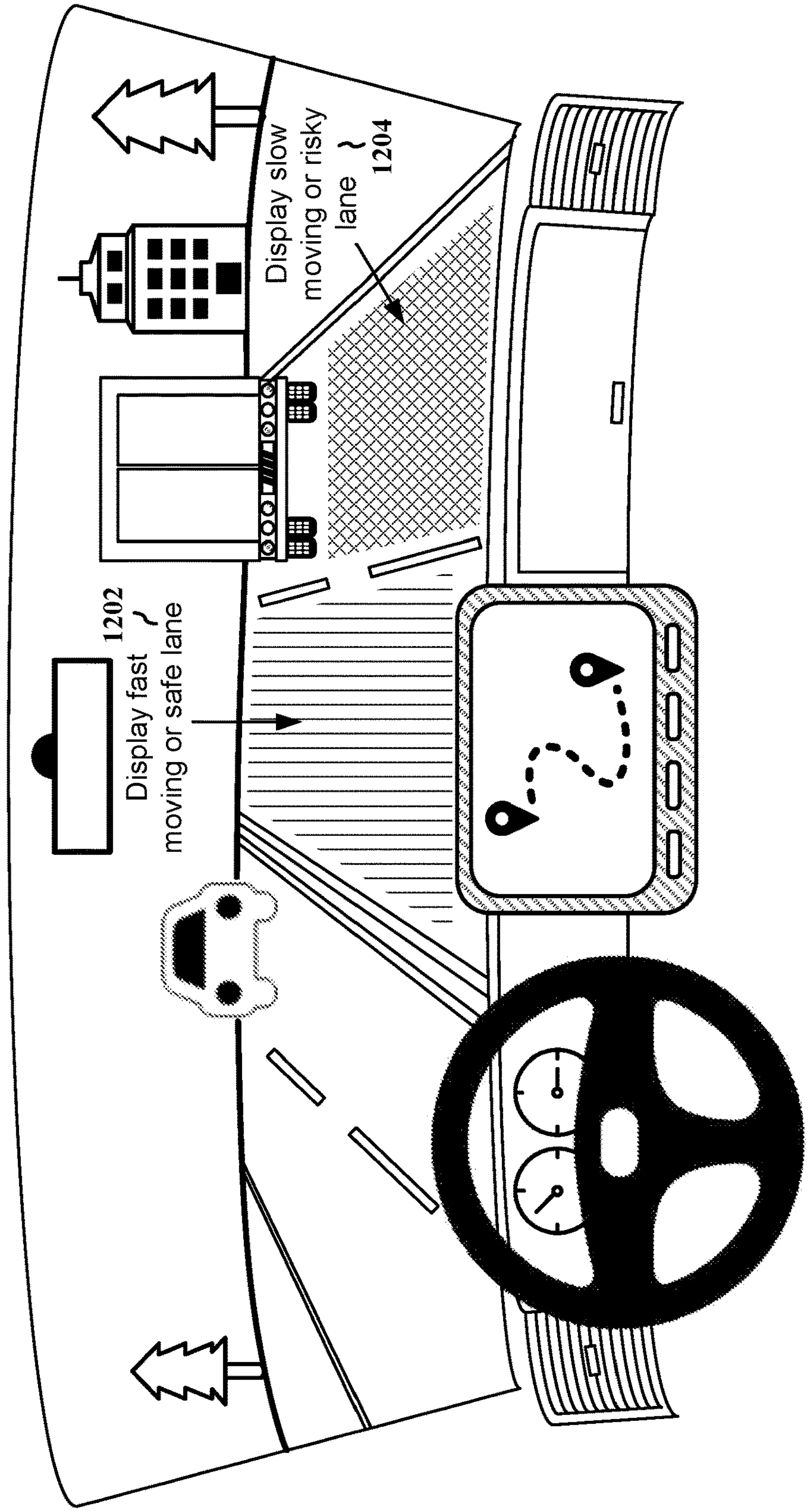
FIG. 12 is a diagram illustrating an example of displaying safety levels for different driving lanes in accordance with various aspects of the present disclosure.

FIG. 12 is a diagram 1200 illustrating an example of displaying safety levels for different driving lanes in accordance with various aspects of the present disclosure. In another aspect of the present disclosure, in addition to or as an alternative to displaying safety margins for objects around a vehicle (e.g., the vehicle 904), a UE (e.g., the UE 902) may be configured to display safety level(s) for one or more lanes on a road on which the UE is travelling. For example, as shown at 1202, for a lane that is not congested (e.g., does not have many vehicles/obstacles or objects with high collision probabilities), the UE may display a first color or pattern (e.g., a green color or without any color or pattern) for that lane which indicates the lane may be suitable for driving fast or at a normal speed. On the other hand, as shown at 1204, for a lane that is congested (e.g., has many vehicles or objects with high collision probabilities), is under construction, and/or has obstacle(s), the UE may display a second color or a pattern (e.g., a red color or a line pattern) for that lane which indicates the lane is suitable for slow driving or driving under normal/regulated speed limit. As such, drivers may be able to determine which lane(s) are safer and which lane(s) are riskier for purposes of changing lanes based on the safety level display for lanes. The safety levels for different lanes may be displayed via a display module, such as the windshield of the vehicle, and/or via mirrors of the vehicle (e.g., via the rearview mirror, side mirror(s), etc.).

Aspects presented herein are directed to techniques for AR display of safety margins to assist drivers with visualizing safety margins with respect to other vehicles/objects/obstacles that may pose some safety issues with respect to the ego vehicle (e.g., encroaching of the path of the ego vehicle). Aspects presented herein may be integrated with an ADAS system. Aspects presented herein may include the following aspects: Calculate probabilities of collision trajectory based on various sources of information including travel paths, objects and obstacles, HD map, V2X data, etc. Calculate dynamic safety margins based on the calculated probabilities and safety margin data for object type/size. AR display showing safety margin with respect to various objects/obstacles that potentially cause safety issues with respect to the ego vehicle's travel path. Other sources of information can also be utilized to customize/optimize the proposed solution. These additional sources of information may include environment conditions, drive's attentiveness level (obtained using DMS), and/or ego vehicle driver model (e.g., driving profile).

Figure 13:
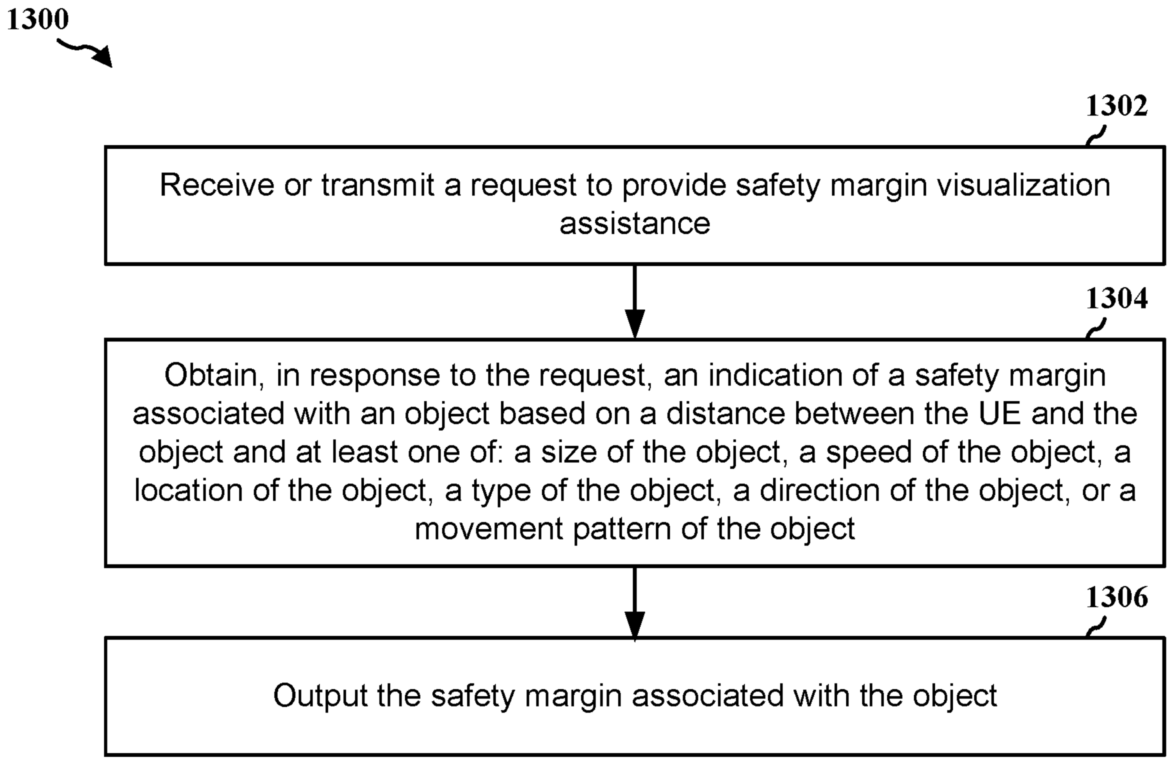
FIG. 13 is a flowchart of a method of wireless communication.

FIG. 13 is a flowchart 1300 of a method of wireless communication. The method may be performed by a UE (e.g., the UE 104, 404, 902; the vehicle 502; the apparatus 1404). The method may enable the UE to calculate and output safety margins for objects around the UE.

At 1302, the UE may receive or transmit a request to provide safety margin visualization assistance, such as described in connection with FIGS. 9 and 10. For example, as discussed in connection with FIG. 9, the UE 902 may provide the safety margin visualization assistance to a user based on a request from the user or an application. For example, the UE 902 may receive, from a user input or an application, a request to provide the safety margin visualization assistance. Based on the request, the UE 902 may calculate or obtain safety margins for the set of objects 906. The reception and/or the transmission of the request may be performed by, e.g., the safety margin generation component 198, the transceiver(s) 1422, the cellular baseband processor(s) 1424, and/or the application processor(s) 1406 of the apparatus 1404 in FIG. 14.

At 1304, the UE may obtain, in response to the request, an indication of a safety margin associated with an object based on a distance between the UE and the object and at least one of: a size of the object, a speed of the object, a location of the object, a direction of the object, or a movement pattern of the object, such as described in connection with FIGS. 9 and 10. For example, as discussed in connection with 1002 of FIG. 10, a UE (e.g., the UE 902) may be configured to calculate dynamic safety margins for one or more objects (e.g., the set of objects 906) surrounding the UE (e.g., within a threshold distance of the UE) based on a set of input, where, the set of inputs may include the size of the object, the speed of the object, the location of the object, the type of the object, the direction of the object, or the movement pattern of the object. The obtaining of the indication may be performed by, e.g., the safety margin generation component 198, the transceiver(s) 1422, the cellular baseband processor(s) 1424, and/or the application processor(s) 1406 of the apparatus 1404 in FIG. 14.

At 1306, the UE may output the safety margin associated with the object, such as described in connection with FIGS. 9 and 10. For example, as shown at 912, the UE 902 may display safety margin(s) around object(s) in a set of objects 906 that are within a threshold distance of the vehicle 904 (e.g., within X meters of the UE 902). The output of the safety margin may be performed by, e.g., the safety margin generation component 198, the transceiver(s) 1422, the cellular baseband processor(s) 1424, and/or the application processor(s) 1406 of the apparatus 1404 in FIG. 14.

In one example, to receive the request to provide the safety margin visualization assistance, the UE may receive, from a user input or an application, the request to provide the safety margin visualization assistance.

In another example, to transmit the request to provide the safety margin visualization assistance, the UE may transmit, to a server, the request to provide the safety margin visualization assistance.

In another example, to obtain the safety margin associated with the object, the UE may calculate the safety margin associated with the object, or receive, from a server, the indication of the safety margin associated with the object. In some implementations, to calculate the safety margin associated with the object, the UE may calculate the safety margin associated with the object using at least one machine learning (ML) or artificial intelligence (AI) (ML/AI) model.

In another example, to output the indication of the safety margin associated with the object, the UE may output the indication of the safety margin associated with the object via at least one of a display module, a tactile module, or a sound module. In some implementations, the display module may be at least one of: an augmented reality (AR) display module; an extended reality (XR) display module; a virtual reality (VR) display module; or a visualization display module.

In another example, the UE may obtain or transmit driver information associated with a driver, where the driver information may include: an attentiveness level of the driver, a suitable or desired safety margin threshold provided by the driver, a current or past driving behavior of the driver, or a combination thereof, where the safety margin associated with the object may be further based on the driver information.

In another example, the UE may obtain environmental information within a threshold range of the UE, where the environmental information may include: road friction, one or more road boundaries, one or more obstacles, a hazard condition, a lighting condition surrounding the UE, a weather condition surrounding the UE, or a combination thereof, where the safety margin associated with the object may be further based on the environmental information.

In another example, the UE may obtain traffic information surrounding the UE, where the traffic information may include: a current traffic condition ahead of a travelling direction of the UE, one or more objects or one or more obstacles ahead of the travelling direction of the UE, one or more traffic conditions provided by at least one other driver or at least one other UE, a map or an updated map of the travelling direction of the UE, collision information associated one or more paths or one or more vehicles, or a combination thereof, where the safety margin associated with the object may be further based on the traffic information. In some implementations, the UE may estimate collision probabilities for the one or more objects or the one or more obstacles ahead of the travelling direction of the UE, where the safety margin may be further based on the estimated collision probabilities.

In another example, the object may be a second vehicle, a pedestrian, an animal, a curb, a median, a lane line, or a divider.

In another example, to output the safety margin associated with the object, the UE may display the safety margin around the object with a contour, a color, a range, a limit, or a combination thereof.

In another example, to output the safety margin associated with the object, the UE may display a safety indication for each lane of a set of lanes on a travelling direction of the UE based on a set of safety margins associated with a set of objects.

Figure 14:
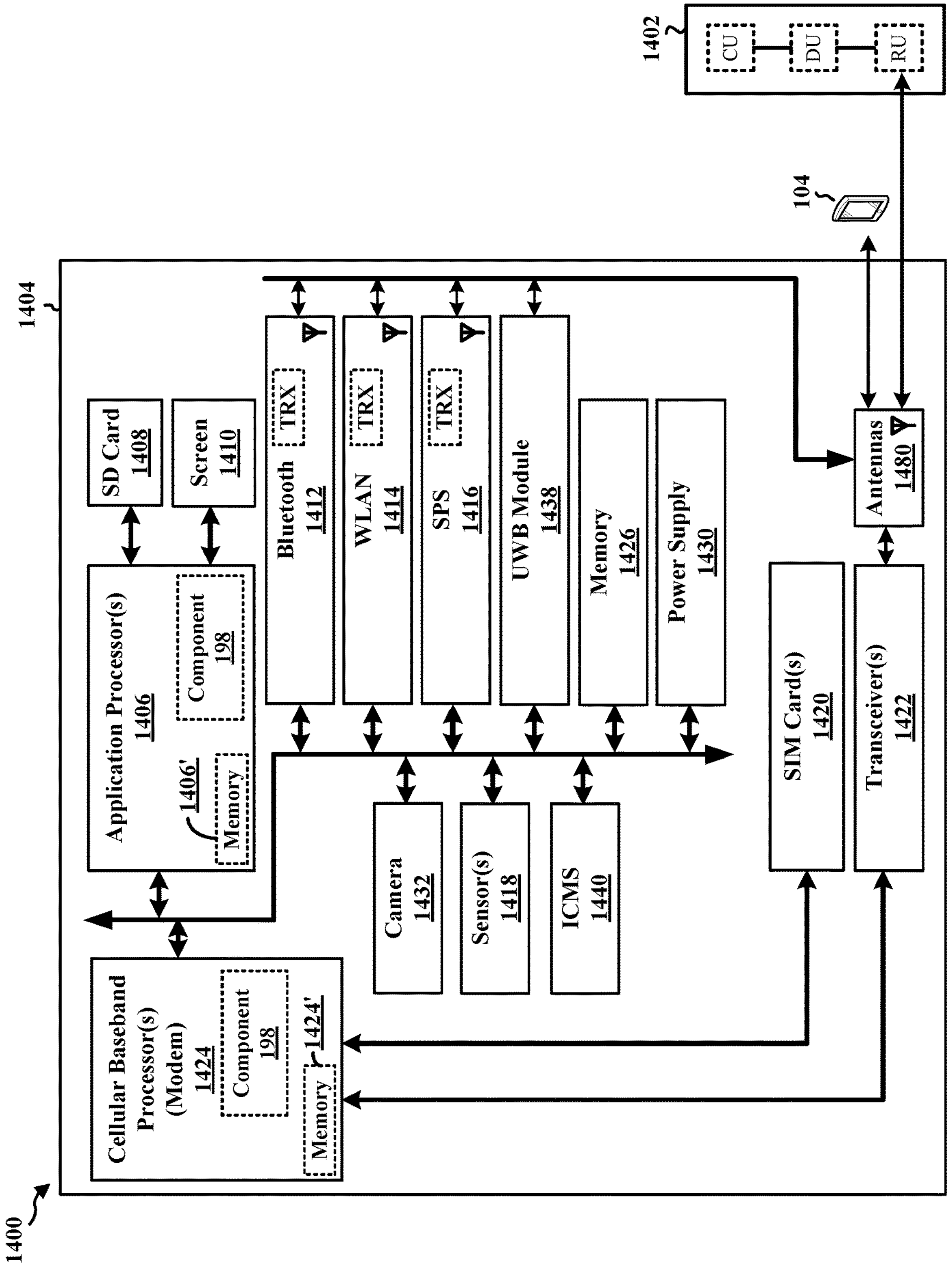
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an ultrawide band (UWB) module 1438, an ICMS 1440, an SPS module 1416 (e.g., GNSS module), one or more sensors 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the UWB module 1438, the ICMS 1440, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the safety margin generation component 198 may be configured to receive or transmit a request to provide safety margin visualization assistance. The safety margin generation component 198 may also be configured to obtain, in response to the request, an indication of a safety margin associated with an object based on a distance between the UE and the object and at least one of: a size of the object, a speed of the object, a location of the object, a type of the object, a direction of the object, or a movement pattern of the object. The safety margin generation component 198 may also be configured to output the safety margin associated with the object. The safety margin generation component 198 may be within the cellular baseband processor(s) 1424, the application processor(s) 1406, or both the cellular baseband processor(s) 1424 and the application processor(s) 1406. The safety margin generation component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for receiving or means for transmitting a request to provide safety margin visualization assistance. The apparatus 1404 may further include means for obtaining, in response to the request, an indication of a safety margin associated with an object based on a distance between the UE and the object and at least one of: a size of the object, a speed of the object, a location of the object, a type of the object, a direction of the object, or a movement pattern of the object. The apparatus 1404 may further include means for outputting the safety margin associated with the object.

In one configuration, the means for receiving the request to provide the safety margin visualization assistance may include configuring the apparatus 1404 to receive, from a user input or an application, the request to provide the safety margin visualization assistance.

In another configuration, the means for transmitting the request to provide the safety margin visualization assistance may include configuring the apparatus 1404 to transmit, to a server, the request to provide the safety margin visualization assistance.

In another configuration, the means for obtaining the safety margin associated with the object may include configuring the apparatus 1404 to calculate the safety margin associated with the object, or receive, from a server, the indication of the safety margin associated with the object. In some implementations, to calculate the safety margin associated with the object, the apparatus 1404 may be configured to calculate the safety margin associated with the object using at least one ML/AI model.

In another configuration, the means for output the indication of the safety margin associated with the object may include configuring the apparatus 1404 to output the indication of the safety margin associated with the object via at least one of a display module, a tactile module, or a sound module. In some implementations, the display module may be at least one of: an AR display module; an XR display module; a VR display module; or a visualization display module.

In another configuration, the apparatus 1404 may further include means for obtaining or means for transmit driver information associated with a driver, where the driver information may include: an attentiveness level of the driver, a suitable or desired safety margin threshold provided by the driver, a current or past driving behavior of the driver, or a combination thereof, where the safety margin associated with the object may be further based on the driver information.

In another configuration, the apparatus 1404 may further include means for obtaining environmental information within a threshold range of the UE, where the environmental information may include: road friction, one or more road boundaries, one or more obstacles, a hazard condition, a lighting condition surrounding the UE, a weather condition surrounding the UE, or a combination thereof, where the safety margin associated with the object may be further based on the environmental information.

In another configuration, the apparatus 1404 may further include means for obtaining traffic information surrounding the UE, where the traffic information may include: a current traffic condition ahead of a travelling direction of the UE, one or more objects or one or more obstacles ahead of the travelling direction of the UE, one or more traffic conditions provided by at least one other driver or at least one other UE, a map or an updated map of the travelling direction of the UE, collision information associated one or more paths or one or more vehicles, or a combination thereof, where the safety margin associated with the object may be further based on the traffic information. In some implementations, the apparatus 1404 may further include means for estimating collision probabilities for the one or more objects or the one or more obstacles ahead of the travelling direction of the UE, where the safety margin may be further based on the estimated collision probabilities.

In another configuration, the object may be a second vehicle, a pedestrian, an animal, a curb, a median, a lane line, or a divider.

In another configuration, the means for outputting the safety margin associated with the object may include configuring the apparatus 1404 to display the safety margin around the object with a contour, a color, a range, a limit, or a combination thereof.

In another configuration, the means for outputting the safety margin associated with the object may include configuring the apparatus 1404 to display a safety indication for each lane of a set of lanes on a travelling direction of the UE based on a set of safety margins associated with a set of objects.

The means may be the safety margin generation component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
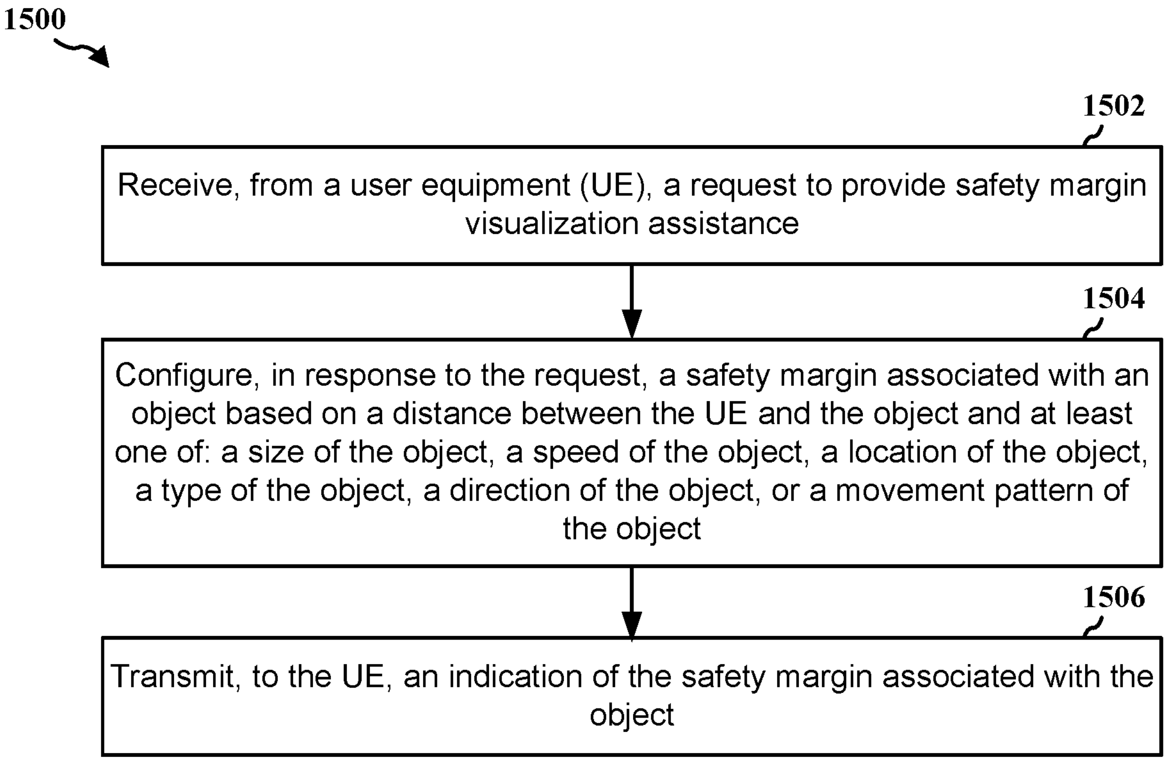
FIG. 15 is a flowchart of a method of wireless communication.

FIG. 15 is a flowchart 1500 of a method of wireless communication. The method may be performed by a network entity (e.g., the server 908; the network entity 1660). The method may enable the server to calculate safety margins for objects around a UE.

At 1502, the network entity may receive, from a user equipment (UE), a request to provide safety margin visualization assistance, such as described in connection with FIGS. 9 and 10. For example, as discussed in connection with FIG. 9, the UE 902 may detect an object using at least one of its sensors, such as detecting the size of the object, the speed of the object, the location (e.g., relative location or absolute location) of the object, the direction of the object, and/or the movement pattern or predicted movement of the object, etc. Then, the UE 902 may provide this information to the server 908 and request the server 908 to calculate a safety margin for this object (or a request to provide the safety margin visualization assistance). The reception of the request may be performed by, e.g., the safety margin calculation component 199, the network processor(s) 1612, and/or the network interface 1680 of the network entity 1660 in FIG. 16.

At 1504, the network entity may configure, in response to the request, a safety margin associated with an object based on a distance between the UE and the object and at least one of: a size of the object, a speed of the object, a location of the object, a type of the object, a direction of the object, or a movement pattern of the object, such as described in connection with FIGS. 9 and 10. For example, as discussed in connection with FIG. 9, based on information associated with an object (received from the UE 902), the request (received from the UE 902), and other information associated with the UE 902 or the vehicle 904 (e.g., the location/speed/size/direction of the vehicle 904), the server 908 may compute the safety margins for the object. The configuration of the safety margin may be performed by, e.g., the safety margin calculation component 199, the network processor(s) 1612, and/or the network interface 1680 of the network entity 1660 in FIG. 16.

At 1506, the network entity may transmit, to the UE, an indication of the safety margin associated with the object, such as described in connection with FIGS. 9 and 10. For example, as discussed in connection with FIG. 9, the server 908 may compute the safety margins for an object, and the server 908 may provide or configure the computed safety margin for the object to the UE 902. The transmission of the indication may be performed by, e.g., the safety margin calculation component 199, the network processor(s) 1612, and/or the network interface 1680 of the network entity 1660 in FIG. 16.

In one example, the network entity may receive, from the UE, information associated with the object, where the information may include at least one of: the size of the object, the speed of the object, the location of the object, the type of the object, the direction of the object, or the movement pattern of the object.

In another example, to configure the safety margin associated with the object, the network entity may calculate the safety margin associated with the object. In some implementations, to calculate the safety margin associated with the object, the network entity may calculate the safety margin associated with the object using at least one ML/AI model.

In another example, the network entity may obtain driver information associated with a driver, where the driver information may include: an attentiveness level of the driver, a suitable or desired safety margin threshold provided by the driver, a current or past driving behavior of the driver, or a combination thereof, where the safety margin associated with the object may be further based on the driver information.

In another example, the network entity may obtain environmental information within a threshold range of the UE, where the environmental information may include: road friction, one or more road boundaries, one or more obstacles, a hazard condition, a lighting condition surrounding the UE, a weather condition surrounding the UE, or a combination thereof, where the safety margin associated with the object may be further based on the environmental information.

In another example, the network entity may obtain traffic information surrounding the UE, where the traffic information may include: a current traffic condition ahead of a travelling direction of the UE, one or more objects or one or more obstacles ahead of the travelling direction of the UE, one or more traffic conditions provided by at least one other driver or at least one other UE, a map or an updated map of the travelling direction of the UE, collision information associated one or more paths or one or more vehicles, or a combination thereof, where the safety margin associated with the object may be further based on the traffic information. In some implementations, the network entity may estimate collision probabilities for the one or more objects or the one or more obstacles ahead of the travelling direction of the UE, where the safety margin may be further based on the estimated collision probabilities.

In another example, the object may be: a second vehicle, a pedestrian, an animal, a curb, a median, a lane line, or a divider.

Figure 16:
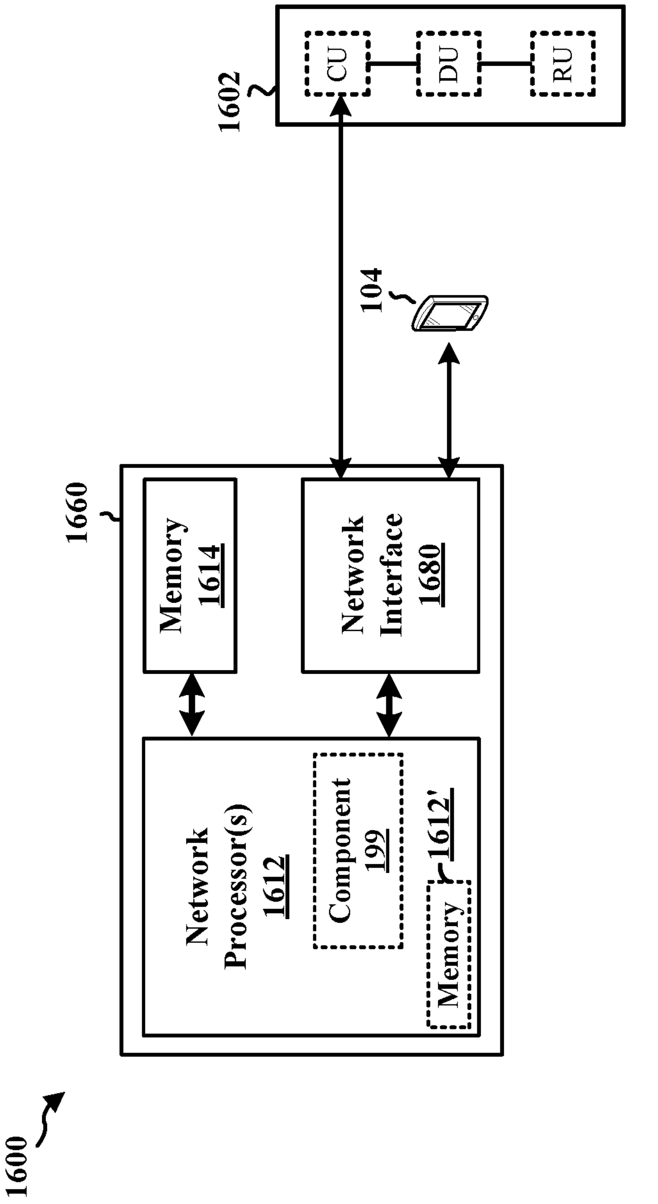
FIG. 16 is a diagram illustrating an example of a hardware implementation for an example network entity.

FIG. 16 is a diagram 1600 illustrating an example of a hardware implementation for a network entity 1660. In one example, the network entity 1660 may be within the core network 120. The network entity 1660 may include at least one network processor 1612. The network processor(s) 1612 may include on-chip memory 1612'. In some aspects, the network entity 1660 may further include additional memory modules 1614. The network entity 1660 communicates via the network interface 1680 directly (e.g., backhaul link) or indirectly (e.g., through a RIC) with the CU 1602. The on-chip memory 1612' and the additional memory modules 1614 may each be considered a computer-readable medium/memory. Each computer-readable medium/memory may be non-transitory. The network processor(s) 1612 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the safety margin calculation component 199 may be configured to receive, from a UE, a request to provide safety margin visualization assistance. The safety margin calculation component 199 may also be configured to configure, in response to the request, a safety margin associated with an object based on a distance between the UE and the object and at least one of: a size of the object, a speed of the object, a location of the object, a type of the object, a direction of the object, or a movement pattern of the object. The safety margin calculation component 199 may also be configured to transmit, to the UE, an indication of the safety margin associated with the object. The safety margin calculation component 199 may be within the network processor(s) 1612. The safety margin calculation component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1660 may include a variety of components configured for various functions. In one configuration, the network entity 1660 may include means for receiving, from a UE, a request to provide safety margin visualization assistance. The network entity 1660 may further include means for configuring, in response to the request, a safety margin associated with an object based on a distance between the UE and the object and at least one of: a size of the object, a speed of the object, a location of the object, a type of the object, a direction of the object, or a movement pattern of the object. The network entity 1660 may further include means for transmitting, to the UE, an indication of the safety margin associated with the object.

In one configuration, the network entity 1660 may further include means for receiving, from the UE, information associated with the object, where the information may include at least one of: the size of the object, the speed of the object, the location of the object, the type of the object, the direction of the object, or the movement pattern of the object.

In another configuration, the means for configure the safety margin associated with the object may include configuring the network entity 1660 to calculate the safety margin associated with the object. In some implementations, to calculate the safety margin associated with the object, the network entity 1660 may be configured to calculate the safety margin associated with the object using at least one ML/AI model.

In another configuration, the network entity 1660 may further include means for obtaining driver information associated with a driver, where the driver information may include: an attentiveness level of the driver, a suitable or desired safety margin threshold provided by the driver, a current or past driving behavior of the driver, or a combination thereof, where the safety margin associated with the object may be further based on the driver information.

In another configuration, the network entity 1660 may further include means for obtaining environmental information within a threshold range of the UE, where the environmental information may include: road friction, one or more road boundaries, one or more obstacles, a hazard condition, a lighting condition surrounding the UE, a weather condition surrounding the UE, or a combination thereof, where the safety margin associated with the object may be further based on the environmental information.

In another configuration, the network entity 1660 may further include means for obtaining traffic information surrounding the UE, where the traffic information may include: a current traffic condition ahead of a travelling direction of the UE, one or more objects or one or more obstacles ahead of the travelling direction of the UE, one or more traffic conditions provided by at least one other driver or at least one other UE, a map or an updated map of the travelling direction of the UE, collision information associated one or more paths or one or more vehicles, or a combination thereof, where the safety margin associated with the object may be further based on the traffic information. In some implementations, the network entity 1660 may further include means for estimating collision probabilities for the one or more objects or the one or more obstacles ahead of the travelling direction of the UE, where the safety margin may be further based on the estimated collision probabilities.

In another configuration, the object may be: a second vehicle, a pedestrian, an animal, a curb, a median, a lane line, or a divider.

The means may be the safety margin calculation component 199 of the network entity 1660 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving or transmitting a request to provide safety margin visualization assistance; obtaining, in response to the request, an indication of a safety margin associated with an object based on a distance between the UE and the object and at least one of: a size of the object, a speed of the object, a location of the object, a type of the object, a direction of the object, or a movement pattern of the object; and outputting the safety margin associated with the object.

Aspect 2 is the method of aspect 1, wherein receiving the request to provide the safety margin visualization assistance comprises: receiving, from a user input or an application, the request to provide the safety margin visualization assistance.

Aspect 3 is the method of aspect 1 or aspect 2, wherein transmitting the request to provide the safety margin visualization assistance comprises: transmitting, to a server, the request to provide the safety margin visualization assistance.

Aspect 4 is the method of any of aspects 1 to 3, wherein obtaining the safety margin associated with the object comprises: calculating the safety margin associated with the object; or receiving, from a server, the indication of the safety margin associated with the object.

Aspect 5 is the method of any of aspects 1 to 4, wherein calculating the safety margin associated with the object comprises: calculating the safety margin associated with the object using at least one machine learning (ML) or artificial intelligence (AI) (ML/AI) model.

Aspect 6 is the method of any of aspects 1 to 5, wherein outputting the indication of the safety margin associated with the object comprises: outputting the indication of the safety margin associated with the object via at least one of a display module, a tactile module, or a sound module.

Aspect 7 is the method of any of aspects 1 to 6, wherein the display module is at least one of: an augmented reality (AR) display module; an extended reality (XR) display module; a virtual reality (VR) display module; or a visualization display module.

Aspect 8 is the method of any of aspects 1 to 7, further comprising: obtaining or transmitting driver information associated with a driver, wherein the driver information includes: an attentiveness level of the driver, a suitable or desired safety margin threshold provided by the driver, a current or past driving behavior of the driver, or a combination thereof; and wherein the safety margin associated with the object is further based on the driver information.

Aspect 9 is the method of any of aspects 1 to 8, further comprising: obtaining environmental information within a threshold range of the UE, wherein the environmental information includes: road friction, one or more road boundaries, one or more obstacles, a hazard condition, a lighting condition surrounding the UE, a weather condition surrounding the UE, or a combination thereof; and wherein the safety margin associated with the object is further based on the environmental information.

Aspect 10 is the method of any of aspects 1 to 9, further comprising: obtaining traffic information surrounding the UE, wherein the traffic information includes: a current traffic condition ahead of a travelling direction of the UE, one or more objects or one or more obstacles ahead of the travelling direction of the UE, one or more traffic conditions provided by at least one other driver or at least one other UE, a map or an updated map of the travelling direction of the UE, collision information associated one or more paths or one or more vehicles, or a combination thereof; and wherein the safety margin associated with the object is further based on the traffic information.

Aspect 11 is the method of any of aspects 1 to 10, further comprising: estimating collision probabilities for the one or more objects or the one or more obstacles ahead of the travelling direction of the UE, wherein the safety margin is further based on the estimated collision probabilities.

Aspect 12 is the method of any of aspects 1 to 11, wherein the object is: a second vehicle, a pedestrian, an animal, a curb, a median, a lane line, or a divider.

Aspect 13 is the method of any of aspects 1 to 12, wherein outputting the safety margin associated with the object comprises: displaying the safety margin around the object with a contour, a color, a range, a limit, or a combination thereof.

Aspect 14 is the method of any of aspects 1 to 13, wherein outputting the safety margin associated with the object comprises: displaying a safety indication for each lane of a set of lanes on a travelling direction of the UE based on a set of safety margins associated with a set of objects.

Aspect 15 is an apparatus for wireless communication at a user equipment (UE), including: at least one memory; and at least one processor coupled to the at least one memory and, based at least in part on information stored in the at least one memory, the at least one processor, individually or in any combination, is configured to implement any of aspects 1 to 14.

Aspect 16 is the apparatus of aspect 15, further including at least one of a transceiver or an antenna coupled to the at least one processor.

Aspect 17 is an apparatus for wireless communication including means for implementing any of aspects 1 to 14.

Aspect 18 is a computer-readable medium (e.g., a non-transitory computer-readable medium) storing computer executable code, where the code when executed by a processor causes the processor to implement any of aspects 1 to 14.

Aspect 19 is a method of wireless communication at a server, comprising: receiving, from a user equipment (UE), a request to provide safety margin visualization assistance; configuring, in response to the request, a safety margin associated with an object based on a distance between the UE and the object and at least one of: a size of the object, a speed of the object, a location of the object, a type of the object, a direction of the object, or a movement pattern of the object; and transmitting, to the UE, an indication of the safety margin associated with the object.

Aspect 20 is the method of aspect 19, further comprising: receiving, from the UE, information associated with the object, wherein the information includes at least one of: the size of the object, the speed of the object, the location of the object, the type of the object, the direction of the object, or the movement pattern of the object.

Aspect 21 is the method of aspect 19 or aspect 20, wherein configuring the safety margin associated with the object comprises: calculating the safety margin associated with the object.

Aspect 22 is the method of any of aspects 19 to 21, wherein calculating the safety margin associated with the object comprises: calculating the safety margin associated with the object using at least one machine learning (ML) or artificial intelligence (AI) (ML/AI) model.

Aspect 23 is the method of any of aspects 19 to 22, further comprising: obtaining driver information associated with a driver, wherein the driver information includes: an attentiveness level of the driver, a suitable or desired safety margin threshold provided by the driver, a current or past driving behavior of the driver, or a combination thereof; and wherein the safety margin associated with the object is further based on the driver information.

Aspect 24 is the method of any of aspects 19 to 23, further comprising: obtaining environmental information within a threshold range of the UE, wherein the environmental information includes: road friction, one or more road boundaries, one or more obstacles, a hazard condition, a lighting condition surrounding the UE, a weather condition surrounding the UE, or a combination thereof; and wherein the safety margin associated with the object is further based on the environmental information.

Aspect 25 is the method of any of aspects 19 to 24, further comprising: obtaining traffic information surrounding the UE, wherein the traffic information includes: a current traffic condition ahead of a travelling direction of the UE, one or more objects or one or more obstacles ahead of the travelling direction of the UE, one or more traffic conditions provided by at least one other driver or at least one other UE, a map or an updated map of the travelling direction of the UE, collision information associated one or more paths or one or more vehicles, or a combination thereof; and wherein the safety margin associated with the object is further based on the traffic information.

Aspect 26 is the method of any of aspects 19 to 25, further comprising: estimating collision probabilities for the one or more objects or the one or more obstacles ahead of the travelling direction of the UE, wherein the safety margin is further based on the estimated collision probabilities.

Aspect 27 is the method of any of aspects 19 to 26, wherein the object is: a second vehicle, a pedestrian, an animal, a curb, a median, a lane line, or a divider.

Aspect 28 is an apparatus for wireless communication at a server, including: at least one memory; and at least one processor coupled to the at least one memory and, based at least in part on information stored in the at least one memory, the at least one processor, individually or in any combination, is configured to implement any of aspects 19 to 27.

Aspect 29 is the apparatus of aspect 28, further including at least one of a transceiver or an antenna coupled to the at least one processor.

Aspect 30 is an apparatus for wireless communication including means for implementing any of aspects 19 to 27.

Aspect 31 is a computer-readable medium (e.g., a non-transitory computer-readable medium) storing computer executable code, where the code when executed by a processor causes the processor to implement any of aspects 19 to 27.

What is claimed is:

1. An apparatus at a user equipment (UE), comprising:

at least one memory; and at least one processor coupled to the at least one memory, wherein the at least one processor is configured to:

receive, from a user input or an application, a request to provide safety margin visualization assistance;

obtain traffic information surrounding the UE, wherein the traffic information includes: a current traffic condition ahead of a travelling direction of the UE, one or more objects or one or more obstacles ahead of the travelling direction of the UE, one or more traffic conditions provided by at least one other driver or at least one other UE, a map or an updated map of the travelling direction of the UE, collision information associated with one or more paths or one or more vehicles, or a combination thereof;

estimate, based on the traffic information, a set of collision probabilities for the one or more objects or the one or more obstacles ahead of the travelling direction of the UE;

calculate, in response to the request and based on the traffic information and the set of collision probabilities, a safety margin associated with an object based on a distance between the UE and the object and at least one of: a size of the object, a speed of the object, a location of the object, a type of the object, a direction of the object with respect to the UE, or a movement pattern of the object;

obtain driver information associated with a driver, wherein the driver information includes a health condition of the driver;

dynamically adjust, based on the driver information, the calculated safety margin associated with the object, wherein the dynamic adjustment comprises expanding or shortening the calculated safety margin around the object based on changes in the traffic information and the driver information;

display, on a windshield of a vehicle, the dynamically adjusted safety margin as a contour around the object; and automatically adjust a speed of the vehicle to maintain a safe distance from the object to avoid or mitigate a potential collision with the object.

2. The apparatus of claim 1, wherein to calculate the safety margin associated with the object, the at least one processor is configured to:

calculate the safety margin associated with the object using at least one machine learning (ML) or artificial intelligence (AI) (ML/AI) model.

3. The apparatus of claim 1, wherein to display, on the windshield of the vehicle, the dynamically adjusted safety margin as the contour around the object, the at least one processor is configured to:

display the dynamically adjusted safety margin around the object via a display module associated with the windshield of the vehicle.

4. The apparatus of claim 3, wherein the display module is at least one of:

an augmented reality (AR) display module;

an extended reality (XR) display module;

a virtual reality (VR) display module; or a visualization display module.

5. The apparatus of claim 1, wherein the at least one processor is further configured to:

obtain or transmit additional driver information associated with the driver, wherein the additional driver information includes:

an attentiveness level of the driver, a suitable safety margin threshold provided by the driver, a current or past driving behavior of the driver, or a combination thereof.

6. The apparatus of claim 1, wherein the at least one processor is further configured to:

obtain environmental information within a threshold range of the UE, wherein the environmental information includes:

road friction, one or more road boundaries, the one or more obstacles, a hazard condition, a lighting condition surrounding the UE, a weather condition surrounding the UE, or a combination thereof; and wherein the safety margin associated with the object is further based on the environmental information.

7. The apparatus of claim 1, wherein the object is:

a second vehicle, a pedestrian, an animal, a curb, a median, a lane line, or a divider.

8. The apparatus of claim 1, wherein to display, on the windshield of the vehicle, the dynamically adjusted safety margin as the contour around the object, the at least one processor is configured to:

to display, on the windshield of the vehicle, the dynamically adjusted safety margin as the contour around the object in a color.

9. The apparatus of claim 1, wherein the at least one processor is further configured to:

display, on the windshield of the vehicle, a safety indication for each lane of a set of lanes in the travelling direction of the vehicle based on a set of safety margins associated with a set of objects.

10. A method at a user equipment (UE), comprising:

receiving, from a user input or an application, a request to provide safety margin visualization assistance;

obtaining traffic information surrounding the UE, wherein the traffic information includes: a current traffic condition ahead of a travelling direction of the UE, one or more objects or one or more obstacles ahead of the travelling direction of the UE, one or more traffic conditions provided by at least one other driver or at least one other UE, a map or an updated map of the travelling direction of the UE, collision information associated with one or more paths or one or more vehicles, or a combination thereof;

estimating, based on the traffic information, a set of collision probabilities for the one or more objects or the one or more obstacles ahead of the travelling direction of the UE;

calculating, in response to the request and based on the traffic information and the set of collision probabilities, a safety margin associated with an object based on a distance between the UE and the object and at least one of: a size of the object, a speed of the object, a location of the object, a type of the object, a direction of the object with respect to the UE, or a movement pattern of the object;

obtaining driver information associated with a driver, wherein the driver information includes a health condition of the driver;

dynamically adjusting, based on the driver information, the calculated safety margin associated with the object, wherein the dynamic adjustment comprises expanding or shortening the calculated safety margin around the object based on changes in the traffic information and the driver information;

displaying, on a windshield of a vehicle, the dynamically adjusted safety margin as a contour around the object; and automatically adjusting a speed of the vehicle to maintain a safe distance from the object to avoid or mitigate a potential collision with the object.

11. The method of claim 10, wherein displaying the dynamically adjusted safety margin as the contour around the object comprises:

displaying the dynamically adjusted safety margin around the object via a display module associated with the windshield of the vehicle.

12. The method of claim 10, further comprising:

obtaining or transmitting additional driver information associated with the driver, wherein the additional driver information includes:

an attentiveness level of the driver, a suitable safety margin threshold provided by the driver, a current or past driving behavior of the driver, or a combination thereof.

13. The method of claim 10, further comprising:

obtaining environmental information within a threshold range of the UE, wherein the environmental information includes:

road friction, one or more road boundaries, the one or more obstacles, a hazard condition, a lighting condition surrounding the UE, a weather condition surrounding the UE, or a combination thereof, and wherein the safety margin associated with the object is further based on the environmental information.

14. An apparatus for wireless communication at a server, comprising:

a network interface;

at least one memory; and at least one processor coupled to the at least one memory and the network interface, wherein the at least one processor is configured to:

receive, from a user equipment (UE) via the network interface, a request to provide safety margin visualization assistance;

obtain traffic information surrounding the UE, wherein the traffic information includes: a current traffic condition ahead of a travelling direction of the UE, one or more objects or one or more obstacles ahead of the travelling direction of the UE, one or more traffic conditions provided by at least one other driver or at least one other UE, a map or an updated map of the travelling direction of the UE, collision information associated with one or more paths or one or more vehicles, or a combination thereof;

estimate, based on the traffic information, a set of collision probabilities for the one or more objects or the one or more obstacles ahead of the travelling direction of the UE;

calculate, in response to the request and based on the traffic information and the set of collision probabilities, a safety margin associated with an object based on a distance between the UE and the object and at least one of: a size of the object, a speed of the object, a location of the object, a type of the object, a direction of the object with respect to the UE, or a movement pattern of the object;

obtain driver information associated with a driver, wherein the driver information includes a health condition of the driver;

dynamically adjust, based on the driver information, the calculated safety margin associated with the object, wherein the dynamic adjustment comprises expanding or shortening the calculated safety margin around the object based on changes in the traffic information and the driver information; and transmit, to the UE via the network interface, an indication of the dynamically adjusted safety margin associated with the object for display on on a windshield of a vehicle and for use by the UE in adjusting a speed of the vehicle to maintain a safe distance from the object.

15. The apparatus of claim 14, wherein the at least one processor is further configured to:

receive, from the UE via the network interface, information associated with the object, wherein the information includes at least one of: the size of the object, the speed of the object, the location of the object, the type of the object, the direction of the object, or the movement pattern of the object.

16. The apparatus of claim 14, wherein to calculate the safety margin associated with the object, the at least one processor is configured to:

calculate the safety margin associated with the object using at least one machine learning (ML) or artificial intelligence (AI) (ML/AI) model.

17. The apparatus of claim 14, wherein the at least one processor is further configured to:

obtain additional driver information associated with the driver, wherein the additional driver information includes:

an attentiveness level of the driver, a suitable safety margin threshold provided by the driver, a current or past driving behavior of the driver, or a combination thereof.

18. The apparatus of claim 14, wherein the at least one processor is further configured to:

obtain environmental information within a threshold range of the UE, wherein the environmental information includes:

road friction, one or more road boundaries, the one or more obstacles, a hazard condition,
a lighting condition surrounding the UE,
a weather condition surrounding the UE, or
a combination thereof; and
wherein the safety margin associated with the object is further based on the environmental information.

19. The apparatus of claim 14, wherein the object is:
a second vehicle, a pedestrian, an animal, a curb, a median, a lane line, or a divider.

20. A method at a server, comprising:
receiving, from a user equipment (UE) via a network interface, a request to provide safety margin visualization assistance;
obtaining traffic information surrounding the UE, wherein the traffic information includes: a current traffic condition ahead of a travelling direction of the UE, one or more objects or one or more obstacles ahead of the travelling direction of the UE, one or more traffic conditions provided by at least one other driver or at least one other UE, a map or an updated map of the travelling direction of the UE, collision information associated with one or more paths or one or more vehicles, or a combination thereof;
estimating, based on the traffic information, a set of collision probabilities for the one or more objects or the one or more obstacles ahead of the travelling direction of the UE;
calculating, in response to the request and based on the traffic information and the set of collision probabilities, a safety margin associated with an object based on a distance between the UE and the object and at least one of: a size of the object, a speed of the object, a location of the object, a type of the object, a direction of the object with respect to the UE, or a movement pattern of the object;
obtaining driver information associated with a driver, wherein the driver information includes a health condition of the driver;
dynamically adjusting, based on the driver information, the calculated safety margin associated with the object, wherein the dynamic adjustment comprises expanding or shortening the calculated safety margin around the object based on changes in the traffic information and the driver information; and
transmitting, to the UE via the network interface, an indication of the dynamically adjusted safety margin associated with the object for display on a windshield of a vehicle and for use by the UE in adjusting a speed of the vehicle to maintain a safe distance from the object.

21. The method of claim 20, further comprising:
receiving, from the UE via the network interface, information associated with the object, wherein the information includes at least one of: the size of the object, the speed of the object, the location of the object, the type of the object, the direction of the object, or the movement pattern of the object.

* * * * *